(12) United States Patent
Qin et al.

(10) Patent No.: US 12,469,536 B2
(45) Date of Patent: Nov. 11, 2025

(54) MEMORY AND ELECTRONIC DEVICE

(71) Applicant: HUAWEI TECHNOLOGIES CO., LTD., Guangdong (CN)

(72) Inventors: Qing Qin, Shenzhen (CN); Xue Zhou, Shenzhen (CN); Xi Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 186 days.

(21) Appl. No.: 18/323,702

(22) Filed: May 25, 2023

(65) Prior Publication Data

US 2023/0298648 A1  Sep. 21, 2023

Related U.S. Application Data

(63) Continuation of application No. PCT/CN2020/132884, filed on Nov. 30, 2020.

(51) Int. Cl.
*G11C 11/00* (2006.01)
*G11C 11/16* (2006.01)
*H01F 10/32* (2006.01)
*H10B 61/00* (2023.01)
*H10N 50/10* (2023.01)
*H10N 50/85* (2023.01)

(52) U.S. Cl.
CPC ........ *G11C 11/161* (2013.01); *G11C 11/1655* (2013.01); *H01F 10/3286* (2013.01); *H10B 61/20* (2023.02); *H10N 50/10* (2023.02); *H10N 50/85* (2023.02)

(58) Field of Classification Search
CPC ......... G11C 11/16; G11C 11/15; H01L 43/18; H01L 27/228
USPC .......................................................... 365/158
See application file for complete search history.

(56) References Cited

U.S. PATENT DOCUMENTS 10,672,447 B2 * 6/2020 Jung ................... G11C 11/1655
2006/0102971 A1  5/2006 Lee et al.
(Continued)

FOREIGN PATENT DOCUMENTS

CN  106611813 A  5/2017

OTHER PUBLICATIONS

Extended European Search Report in European Appln. No. 20963075.5, mailed on Dec. 8, 2023, 10 pages.
(Continued)

*Primary Examiner* — Son T Dinh
(74) *Attorney, Agent, or Firm* — Fish & Richardson P.C.

(57) ABSTRACT

An example memory includes a plurality of storage units and bit lines distributed in an array in a storage area of the memory, where each of the storage unit includes a transistor and a magnetic tunnel junction (MTJ) element connected to the transistor. The MTJ element is disposed on a current transmission path between a source or a drain of the transistor and the bit line. The MTJ element includes a pinning layer, a reference layer, a tunneling layer, and a free layer that are stacked in sequence, and a magnetization direction of the pinning layer is parallel to a stacking direction of layers in the MTJ. The example memory further includes a first magnetic structure disposed on the current transmission path and in contact with the MTJ element. An included angle between a magnetization direction of the first magnetic structure and the magnetization direction of the pinning layer is (90°, 180°].

20 Claims, 15 Drawing Sheets

(56) References Cited

U.S. PATENT DOCUMENTS

| | | |
|---|---|---|
| 2015/0311431 A1 | 10/2015 | Zhou et al. |
| 2016/0079307 A1* | 3/2016 | Lu .......................... H10N 50/85 |
| | | 257/421 |
| 2017/0279040 A1 | 9/2017 | Tran et al. |
| 2018/0082727 A1 | 3/2018 | Lee |
| 2020/0105830 A1 | 4/2020 | Chiang et al. |
| 2020/0136019 A1* | 4/2020 | Lin ........................ H10B 61/22 |
| 2020/0136022 A1* | 4/2020 | Lin ........................ H10N 52/80 |
| 2020/0312908 A1* | 10/2020 | Oguz ..................... H10N 50/85 |

OTHER PUBLICATIONS

Schoen et al., "Ultra-low magnetic damping of a metallic ferromagnet," Nature Physics, May 16, 2016, 5 pages.
Bersweiler et al., "Magnetic and Free-Layer Properties of MgO/(Co)FeB/MgO Structures: Dependence on CoFeB Composition," IEEE Magnetics Letters, vol. 8, Sep. 2017, 3 pages.
International Search Report and Written Opinion in International Appln. No. PCT/CN2020/132884, mailed on Aug. 27, 2021, 13 pages (with English translation).

* cited by examiner

1231a/1231c (1231)

▓ Heavy metal layer
▨ Ferromagnetic layer

MEMORY AND ELECTRONIC DEVICE

CROSS-REFERENCE TO RELATED APPLICATIONS

This application is a continuation of International Application No. PCT/CN2020/132884, filed on Nov. 30, 2020, the disclosure of which is hereby incorporated by reference in its entirety.

TECHNICAL FIELD

This application relates to the field of memory technologies, and in particular, to a memory and an electronic device.

BACKGROUND

A magnetic random access memory (MRAM) is a new-type non-volatile memory. A spin transfer torque magnetic random access memory (STT MRAM) has gained wide attention because of its advantages such as a high speed, low power consumption, and good COMS (complementary metal-oxide-semiconductor) compatibility.

Reading and writing functions of the spin transfer torque magnetic random access memory are implemented by a storage unit of the spin transfer torque magnetic random access memory. A main structure of the storage unit includes a magnetic tunnel junction (MTJ) element and a transistor. A structure of the MTJ mainly includes a free layer for storing information, a tunneling layer, a reference layer with a fixed magnetization direction, and a pinning layer that are stacked in sequence. The magnetization direction of the reference layer is pinned by the pinning layer in a specific direction, and a magnetization direction of the free layer may change. When currents flow through the MTJ in different directions (where the current flows from a fixed layer to the free layer or the current flows from the free layer to the fixed layer), the magnetization direction of the free layer changes accordingly. When the magnetization direction of the free layer is parallel to the magnetization direction of the reference layer, in other words, when the magnetization direction of the free layer is the same as the magnetization direction of the reference layer, the storage unit presents low resistance, and stored information is "0". When the magnetization direction of the free layer is oppositely parallel to the magnetization direction of the reference layer, in other words, when the magnetization direction of the free layer is opposite to the magnetization direction of the reference layer, the storage unit presents high resistance, and stored information is "1". Reading of the magnetic random access memory is to detect resistance of a storage unit. A constant small current flows through an MTJ from a bit line, and a potential difference is generated at two ends of the MTJ. Resistance of the MTJ may be determined based on a value of the potential difference, and then it may be determined that information stored in the magnetic random access memory is "0" or "1".

Currently, because the pinning layer has a strong stray field, the free layer generates a large compensation field. In this way, a current required for flipping the free layer is increased.

SUMMARY

Embodiments of this application provide a memory and an electronic device, to resolve a problem of a large current required for flipping a free layer in an MTJ.

To achieve the foregoing objective, the following technical solutions are used in this application.

According to a first aspect, a memory is provided. The memory includes a plurality of storage units and bit lines distributed in an array in a storage area of the memory, where the storage unit includes a transistor and a magnetic tunnel junction MTJ element connected to the transistor. The MTJ element is disposed on a current transmission path between a source or a drain of the transistor and the bit line, the MTJ element includes a pinning layer, a reference layer, a tunneling layer, and a free layer that are stacked in sequence, and a magnetization direction of the pinning layer is parallel to a stacking direction of layers in the MTJ. The memory further includes a first magnetic structure disposed on the current transmission path and in contact with the MTJ element. An included angle between a magnetization direction of the first magnetic structure and the magnetization direction of the pinning layer is (90°, 180°]. Because the included angle between the magnetization direction of the first magnetic structure and the magnetization direction of the pinning layer is (90°, 180°], a magnetic field generated by the first magnetic structure at the free layer can cancel a magnetic field generated by the pinning layer at the free layer, so that a compensation field generated by the free layer can be reduced or eliminated. In this way, a current required for flipping the free layer is reduced, and a problem of flipping asymmetry in the MTJ can be resolved. In addition, because the magnetic field generated by the pinning layer at the free layer may be canceled by the magnetic field generated by the first magnetic structure at the free layer, a difference caused by impact of a stray field on the free layer does not need to be overcome by increasing a current. In this way, a magnetization direction of the free layer can be flipped by using a small current, so that power can be reduced, durability of the MTJ can be improved, and a lifespan of the MTJ can be improved.

In a possible implementation, the magnetization direction of the first magnetic structure is opposite to the magnetization direction of the pinning layer, and a magnitude of the magnetic field generated by the first magnetic structure at the free layer is the same as that of the magnetic field generated by the pinning layer at the free layer. In this way, the magnetic field generated by the first magnetic structure at the free layer can cancel the magnetic field generated by the pinning layer at the free layer. Therefore, a magnetic field, generated by another layer, applied to the free layer is zero or approaches zero, and a compensation field generated by the free layer due to the magnetic field generated by the another layer is zero or approaches zero. This further reduces the current required for flipping the free layer, and more effectively resolves the problem of flipping asymmetry in the MTJ.

In a possible implementation, the magnetization direction of the first magnetic structure is opposite to the magnetization direction of the pinning layer, and a magnitude of the magnetic field generated by the first magnetic structure at the free layer is the same as magnitudes of magnetic fields generated by the pinning layer and the reference layer at the free layer. In this way, both the magnetic fields generated by the pinning layer and the reference layer at the free layer can be canceled by the magnetic field generated by the first magnetic structure at the free layer. This further reduces the current required for flipping the free layer.

In a possible implementation, the first magnetic structure is connected between the MTJ element and the source or the drain of the transistor.

In a possible implementation, the first magnetic structure is connected between the MTJ element and the bit line.

In a possible implementation, the MTJ element further includes a first electrode and a second electrode; the first electrode is located on a side that is of the free layer and that is away from the pinning layer, and the second electrode is located on a side that is of the pinning layer and that is away from the free layer; and the first electrode is electrically connected to the bit line, and the second electrode is electrically connected to the source or the drain of the transistor; or the first electrode is electrically connected to the source or the drain of the transistor, and the second electrode is electrically connected to the bit line. Herein, magnitudes of voltages applied to the first electrode and the second electrode determine a flow direction of a current in the MTJ element.

In a possible implementation, a material of the first magnetic structure includes one or more of monatomic cobalt, monatomic iron, monatomic nickel, and an alloy including at least one of cobalt, iron, or nickel.

In a possible implementation, the pinning layer includes a ferromagnetic layer and a heavy metal layer that are alternately stacked along the stacking direction of the layers in the MTJ. Compared with a current technology in which the pinning layer includes a first pinning sub-layer, a non-magnetic layer, and a second pinning sub-layer, and the first pinning sub-layer and the second pinning sub-layer each include a ferromagnetic layer and a heavy metal layer that are alternately stacked along the stacking direction of the layers in the MTJ, in this embodiment of this application, because the pinning layer in this embodiment of this application includes only the ferromagnetic layer and the heavy metal layer that are alternately stacked along the stacking direction of the layers in the MTJ, a thickness of the pinning layer is greatly reduced, and a structure is simplified. This helps reduce roughness of an interface between the tunneling layer and the free layer, reduce stress accumulation, and facilitate miniaturization of the MTJ. In addition, because the thickness of the pinning layer is greatly reduced, in other words, thickness of a conductive material below the tunneling layer is reduced, a probability of a short circuit caused by resputtering in an etching process is reduced, and an engineering yield is improved.

In a possible implementation, a material of the ferromagnetic layer includes one or more of monatomic cobalt, monatomic iron, monatomic nickel, and an alloy including at least one of cobalt, iron, or nickel; and a material of the heavy metal layer includes one or more of monatomic platinum, monatomic tantalum, monatomic copper, monatomic iridium, monatomic ruthenium, monatomic tungsten, and an alloy including at least one of platinum, tantalum, copper, iridium, ruthenium, or tungsten.

In a possible implementation, a material of the pinning layer is a perpendicular magnetic anisotropy material. Because the material of the pinning layer is the perpendicular magnetic anisotropy material, the magnetization direction of the pinning layer is easily magnetized to be parallel to the stacking direction of the layers in the MTJ. In this way, thickness of the pinning layer may be set to be small. Therefore, compared with a current technology, in this embodiment of this application, the thickness of the pinning layer is greatly reduced, and a structure is simplified. This helps reduce roughness of an interface between the tunneling layer and the free layer, reduce stress accumulation, and facilitate miniaturization of the MTJ. In addition, because the thickness of the pinning layer is greatly reduced, in other words, thickness of a conductive material below the tunneling layer is reduced, a probability of a short circuit caused by resputtering in an etching process is reduced, and an engineering yield is improved.

In a possible implementation, the material of the pinning layer includes one or more of an iron-platinum alloy and a cobalt-platinum alloy.

In a possible implementation, materials of the reference layer and the free layer include a cobalt-ferroboron CoFeB alloy; and a material of the tunneling layer includes magnesium oxide MgO.

In a possible implementation, a gate of the transistor is connected to a word line control circuit through a word line WL, the source or the drain of the transistor is connected to a data line, and the bit line BL is connected to a bit line control circuit.

In a possible implementation, the memory further includes a second magnetic structure disposed on the current transmission path; a direction of a magnetic field generated by the second magnetic structure at the free layer is not parallel to a magnetization direction of the free layer; and a projection of the MTJ element on a connection layer does not overlap a projection of the second magnetic structure on the connection layer. The first magnetic structure is connected between the MTJ element and the source or the drain of the transistor, and the second magnetic structure is connected between the MTJ element and the bit line; or the first magnetic structure is connected between the MTJ element and the bit line, and the second magnetic structure is connected between the MTJ element and the source or the drain of the transistor. Because the direction of the magnetic field generated by the second magnetic structure at the free layer is not parallel to the magnetization direction of the free layer, the magnetic field generated by the second magnetic structure at the free layer may apply magnetic field force to the free layer. This facilitates flipping of the free layer. In this way, the current required for flipping the free layer is reduced, STT incubation time is reduced, and a flipping speed of the free layer is increased.

In a possible implementation, the direction of the magnetic field generated by the second magnetic structure at the free layer is perpendicular to the magnetization direction of the free layer. In this way, the magnetic field generated by the second magnetic structure at the free layer is larger, which is more conducive to flipping of the free layer. Therefore, the current required for flipping the free layer can be further reduced, the STT incubation time can be further reduced, and the flipping speed of the free layer can be more effectively improved.

In a possible implementation, the memory further includes the connection layer disposed between the second magnetic structure and the MTJ element, and the second magnetic structure is electrically connected to the MTJ element through the connection layer; and the projection of the MTJ element on the connection layer does not overlap at least a part of areas of the projection of the second magnetic structure on the connection layer. The direction of the magnetic field generated by the second magnetic structure at the free layer may be adjusted by adjusting a magnetization direction of the second magnetic structure and relative locations of the MTJ element and the second magnetic structure in a direction perpendicular to the stacking direction of the layers in the MTJ, to enable the direction of the magnetic field generated by the second magnetic structure at the free layer to be not parallel to the magnetization direction of the free layer.

According to a second aspect, an electronic device is provided. The electronic device includes a circuit board and a memory electrically connected to the circuit board, and the memory is the foregoing memory. The electronic device has technical effects the same as those in the foregoing embodiment. Details are not described herein again

BRIEF DESCRIPTION OF DRAWINGS

FIG. 8b is a simulation result diagram of locations marked by a black straight line A and a black straight line B in FIG. 8a;

FIG. 13 is a simulation result diagram of a plane at a location marked by a black straight line B in FIG. 8a.

REFERENCE NUMERALS

10—Memory; 11—Storage unit; 12—MTJ element; 13—Substrate; 15—Conductive structure; 16—First magnetic structure; 17—Second magnetic structure; 18—Connection layer; 121—First electrode; 122—Second electrode; 141—Source; 142—Drain; 143—Active layer; 144—Gate; 151—First conductive part; 152—Second conductive part; 1231—Pinning layer; 1232—Reference layer; 1233—Tunneling layer; 1234—Free layer; 1235—Seed layer; 1236—Structure conversion layer; 1237—Capping layer.

DESCRIPTION OF EMBODIMENTS

The following describes technical solutions in embodiments of this application with reference to the accompanying drawings in embodiments of this application. It is clear that the described embodiments are merely some rather than all of embodiments of this application.

Unless otherwise defined, all technical and scientific terms used herein have the same meanings as those commonly understood by a person of ordinary skill in the art.

The following terms "first", "second" and the like are merely intended for ease of description, and shall not be understood as an indication or implication of relative importance or implicit indication of a quantity of indicated technical features. Therefore, a feature limited by "first", "second" and the like may explicitly indicate or implicitly include one or more such features. In addition, the term "electrical connection" may be a direct electrical connection, or may be an indirect electrical connection through an intermediate medium.

It should be noted that in this application, the term such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the term such as "example" or "for example" is intended to present a relative concept in a specific manner.

The technical solutions provided in this application may be applied to various storage systems that use a magnetic random access memory. For example, the technical solutions provided in this application are applied to a computer. For another example, the technical solutions provided in this application are applied to a storage system including a memory or a processor and a memory. The processor may be a central processing unit (central processing unit, CPU), an artificial intelligence (artificial intelligence, AI) processor, a digital signal processor (digital signal processor), a neural network processor, or the like.

Figure 1A:
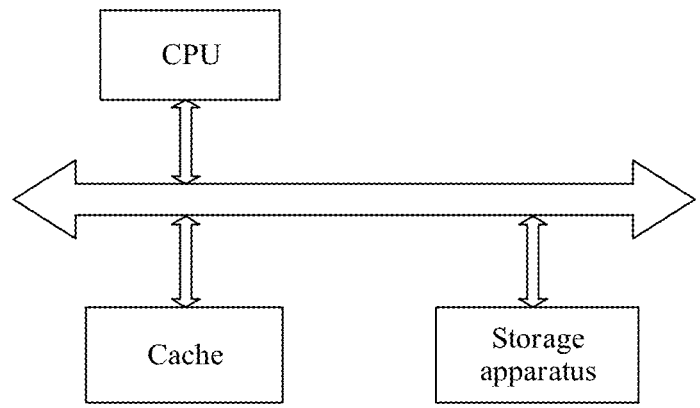
FIG. 1a is a schematic structural diagram of a storage system according to an embodiment of this application.

FIG. 1a is a schematic structural diagram of a storage system according to an embodiment of this application. The storage system may include a storage apparatus, and the storage apparatus may be a magnetic random access memory. Optionally, the storage system may further include a CPU, a cache (cache), a controller, and the like.

Figure 1B:
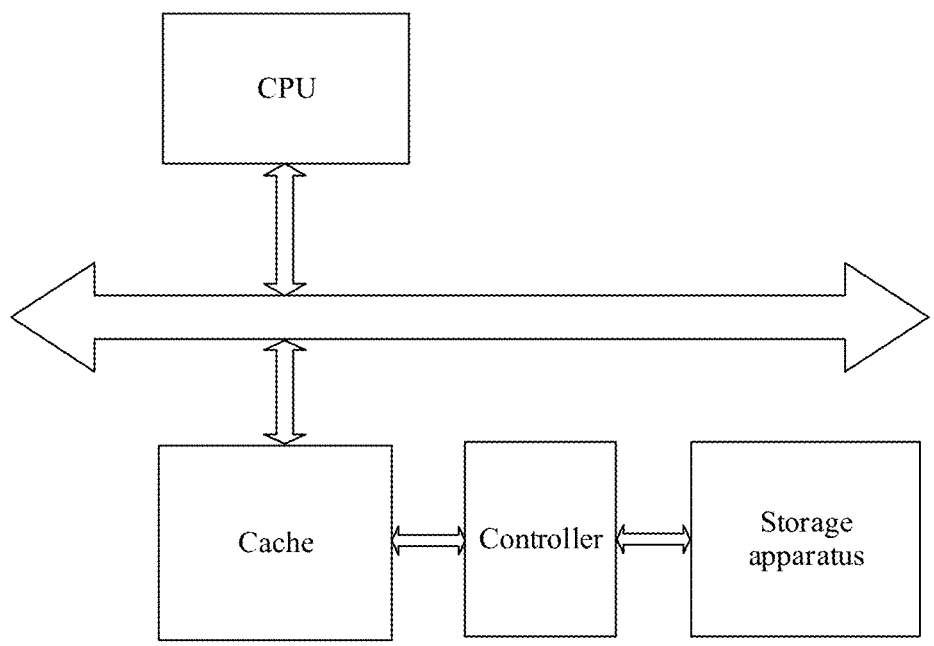
FIG. 1B is a schematic structural diagram of a storage system according to another embodiment of this application.
Figure 1C:
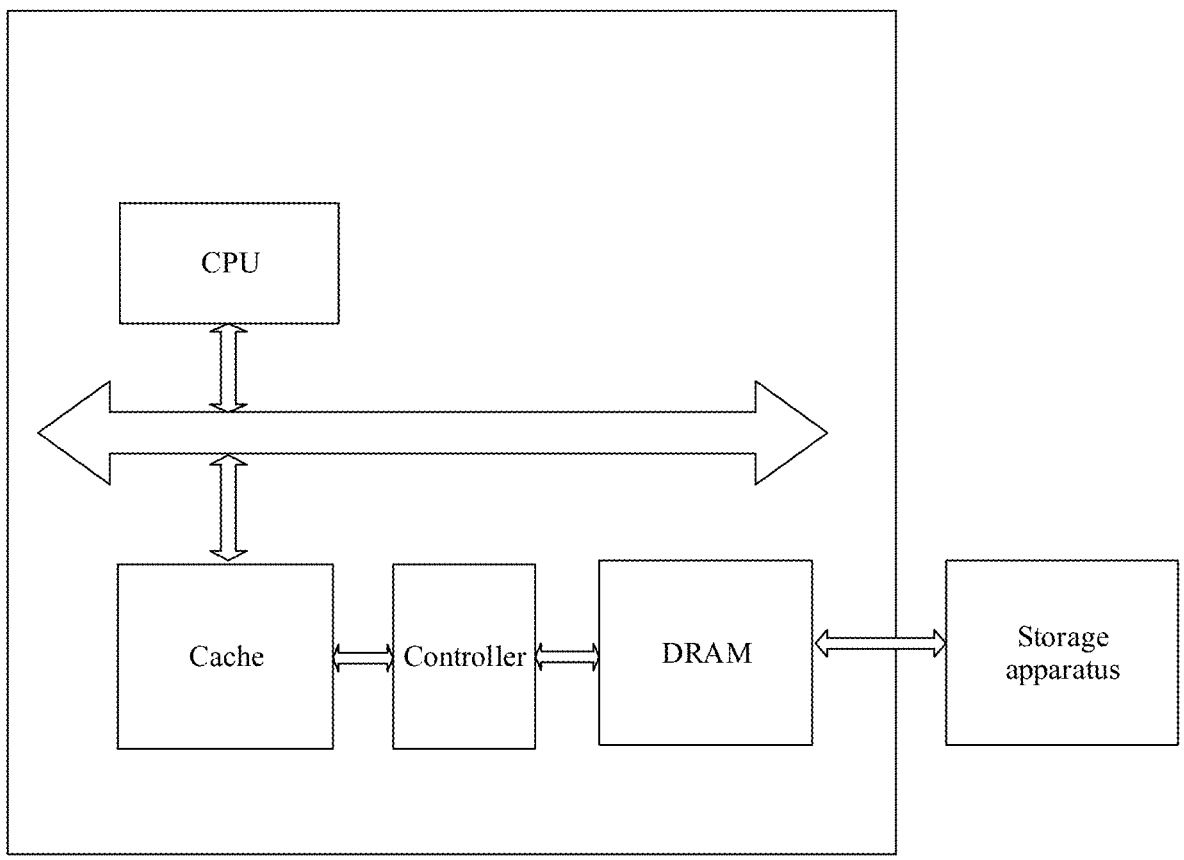
FIG. 1c is a schematic structural diagram of a storage system according to still another embodiment of this application.

In an embodiment, as shown in FIG. 1a, the storage system includes a CPU, a cache, and a storage apparatus that are integrated together. In another embodiment, as shown in FIG. 1B, the storage system may be used as an independent memory. The storage system includes a CPU, a cache, a controller, and a storage apparatus that are integrated together. The storage apparatus is coupled to the cache and the CPU through the controller. In still another embodiment, as shown in FIG. 1c, the storage system includes a storage apparatus, and a CPU, a cache, a controller, and a dynamic random access memory (dynamic random access memory, DRAM) that are integrated together. The storage apparatus may be coupled to the DRAM as an external storage apparatus. The DRAM is coupled to the cache and the CPU through the controller. The CPUs in the various storage systems shown in FIG. 1a, FIG. 1B, and FIG. 1c may also be replaced with CPU cores (cores). The storage apparatuses in FIG. 1a, FIG. 1B, and FIG. 1c may be magnetic random access memories.

The foregoing magnetic random access memory (referred to as a memory below) includes an MTJ, and the MTJ includes a pinning layer, a reference layer, a tunneling layer, and a free layer that are stacked in sequence. Because a strong magnetic field, that is, a stray field (which may also be referred to as a static magnetic field), is generated around the pinning layer, and the free layer is located around the pinning layer (for example, above the pinning layer), the pinning layer generates a strong stray field at the free layer, and the free layer generates a large compensation field. In this way, a current required for flipping the free layer is increased. When a size of the storage unit is large, the stray field generated by the pinning layer mainly has an edge effect, and has little impact on flipping of the free layer. When the size of the storage unit is small, the stray field basically acts in a direction parallel to a stacking direction of layers in the MTJ. Therefore, the stray field acts greatly in the direction parallel to the stacking direction of the layers in the MTJ, and the flipping of the free layer is greatly affected. Based on this, because a size of a storage unit in a current memory is increasingly small, impact of a stray field is increasingly large. In addition, in a highly integrated MTJ array, this problem is becoming more serious. This is because in the highly integrated MTJ array, a free layer is small and thin, is very sensitive to an external magnetic field, and has an extremely high requirement on evenness of etching. As long as a shape of the free layer after etching is different, for example, a size or a location of the free layer is different, impact of a stray field on the free layer is also greatly different. To reduce a difference, a magnitude of a current needs to be increased, to ensure reading/writing accuracy. However, increasing the current not only increases power, but also seriously affects durability of an MTJ. Consequently, a lifespan of the MTJ may be greatly reduced.

Based on the foregoing descriptions, to reduce the current required for flipping the free layer, the following describes a structure of a memory in a specific embodiment of this application by using examples.

Figure 2:
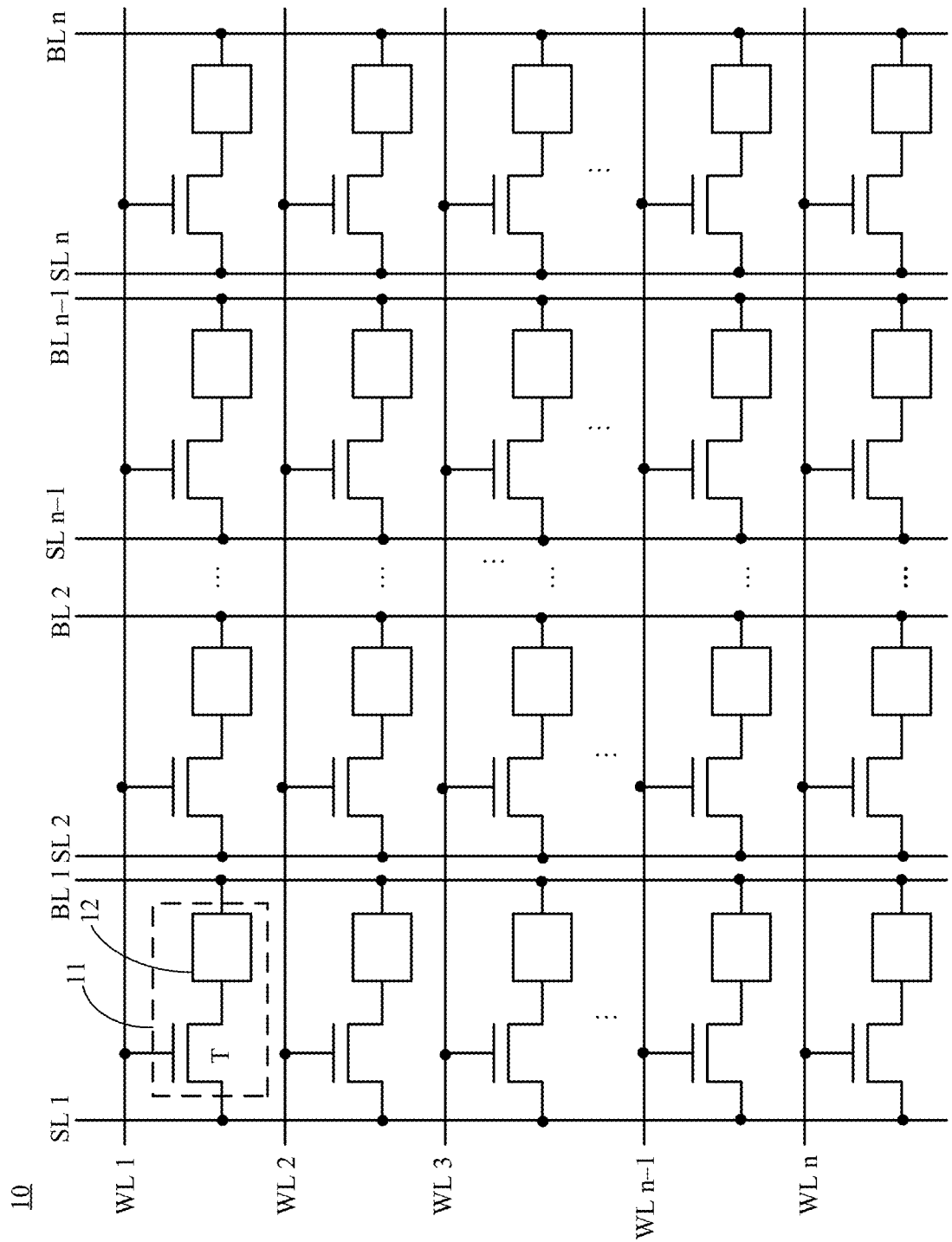
FIG. 2 is a schematic structural diagram of a memory according to an embodiment of this application.

This application provides a memory, which may be used in the foregoing storage system. As shown in FIG. 2, a structure of the memory 10 includes a plurality of storage units 11 distributed in an array in a storage area of the memory 10. The storage unit 11 includes a transistor T and a magnetic tunnel junction MTJ element 12 connected to the transistor T.

The transistor T may be a thin film transistor (thin film transistor, TFT), or may be a transistor of another type such as a MOS (metal oxide semiconductor) transistor. The transistor T includes a source, a drain, an active layer, a gate insulation layer, and a gate, where both the source and the drain are in contact with the active layer, and the gate insulation layer is disposed between the gate and the active layer.

As shown in FIG. 2, the structure of the memory 10 further includes a plurality of word lines (word lines, WLs) arranged in parallel and a plurality of bit lines (bit lines, BLs) arranged in parallel, and the word line WL and the bit line BL cross each other. For example, the word line WL and the bit line BL are perpendicular to each other. In some embodiments, the memory 10 further includes a plurality of data lines arranged in parallel, and the data line may be parallel to the bit line BL. The gate of the transistor T is electrically connected to the word line WL, and the source or the drain of the transistor T is electrically connected to the data line. Herein, the source of the transistor T may be electrically connected to the data line. In this case, the data line may also be referred to as a source line (source line, SL). Alternatively, the drain of the transistor T may be electrically connected to the data line. FIG. 2 shows an example in which the source of the transistor T is electrically connected to the source line.

In some embodiments, the word line WL is further electrically connected to a word line control circuit, and the word line control circuit is used to provide a high-level signal or a low-level signal for the word line WL, so that the transistor T is in a conducted state or a cut-off state. When the transistor T is an N-type transistor, a high-level signal controls the transistor T to be conducted, and a low-level signal controls the transistor T to be cut off. When the transistor T is a P-type transistor, a low-level signal controls the transistor T to be conducted, and a high-level signal controls the transistor T to be cut off.

In some embodiments, the bit line BL is further electrically connected to a bit line control circuit, and the bit line control circuit is used to provide a signal for the bit line BL.

In some embodiments, the data line is grounded.

The MTJ element 12 is disposed on a current transmission path between the source or the drain of the transistor T and the bit line BL.

Figure 3A:
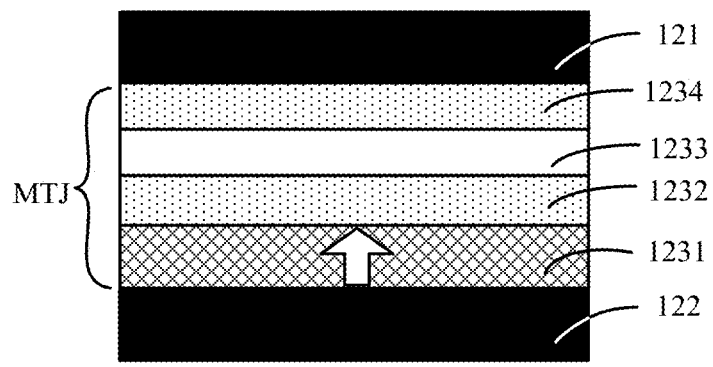
FIG. 3a is a schematic structural diagram of an MTJ element according to an embodiment of this application.

As shown in FIG. 3a, the MTJ element 12 includes a first electrode 121, a second electrode 122, and an MTJ located between the first electrode 121 and the second electrode 122. The MTJ includes a pinning layer 1231, a reference layer 1232, a tunneling layer 1233, and a free layer 1234 that are stacked in sequence. A magnetization direction (which may also be referred to as a magnetic moment direction) of the pinning layer 1231 is parallel to a stacking direction of layers in the MTJ. The first electrode 121 is located on a side that is of the free layer 1234 and that is away from the pinning layer 1231, and the second electrode 122 is located on a side that is of the pinning layer 1231 and that is away from the free layer 1234. The first electrode 121 in the MTJ element 12 is electrically connected to the bit line BL, and the second electrode 122 is electrically connected to the drain or the source of the transistor T. Alternatively, the first electrode 121 is electrically connected to the drain or the source of the transistor T, and the second electrode 122 is electrically connected to the bit line BL. An example in which the first electrode 121 is electrically connected to the bit line BL, the second electrode 122 is electrically connected to the drain of the transistor T, and the source of the transistor T is electrically connected to the source line SL is used below for description.

It should be understood that when the second electrode 122 or the first electrode 121 is electrically connected to the drain of the transistor T, the source of the transistor T is electrically connected to the data line. When the second electrode 122 or the first electrode 121 is electrically connected to the source of the transistor T, the drain of the transistor is electrically connected to the data line.

Figure 3B:
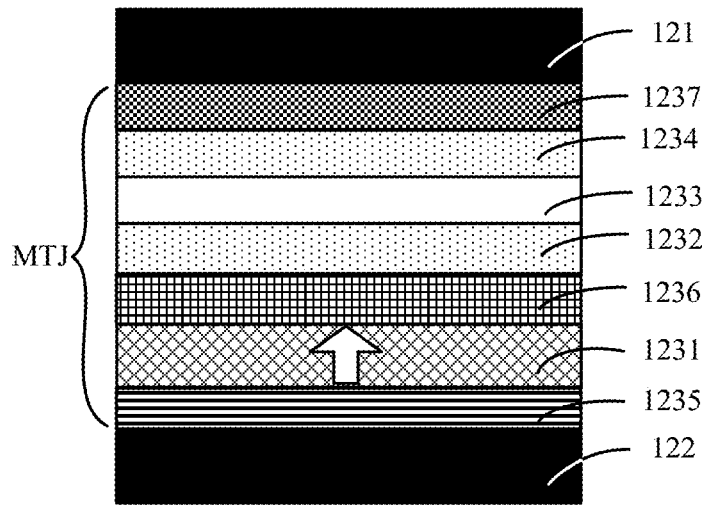
FIG. 3b is a schematic structural diagram of an MTJ element according to another embodiment of this application.

It should be noted that the stacking direction of the layers in the MTJ may be from the pinning layer 1231 to the free layer 1234, or may be from the free layer 1234 to the pinning layer 1231. Arrows marked in the pinning layer 1231 in FIG. 3*a* and FIG. 3*b* are magnetization directions of the pinning layer 1231. For example, the stacking direction of the layers in the MTJ is a direction from the pinning layer 1231 to the free layer 1234. In this case, the arrows marked in the pinning layer 1231 in FIG. 3*a* and FIG. 3*b* may also represent the stacking direction of the layers in the MTJ. For example, the stacking direction of the layers in the MTJ is a direction from the pinning layer 1231 to the free layer 1234. That the magnetization direction of the pinning layer 1231 is parallel to the stacking direction of the layers in the MTJ may be that the magnetization direction of the pinning layer 1231 is the same as the stacking direction of the layers in the MTJ, in other words, the magnetization direction of the pinning layer 1231 is the direction from the pinning layer 1231 to the free layer 1234. Alternatively, that the magnetization direction of the pinning layer 1231 is parallel to the stacking direction of the layers in the MTJ may be that the magnetization direction of the pinning layer 1231 is parallel to and opposite to the stacking direction of the layers in the MTJ, in other words, the magnetization direction of the pinning layer 1231 is a direction from the free layer 1234 to the pinning layer 1231.

In addition, the reference layer 1232 is a film layer with a fixed magnetization direction in the MTJ. There is a strong ferromagnetic coupling effect between the pinning layer 1231 and the reference layer (which may also be referred to as a pinning layer) 1232. A magnetization direction of the reference layer 1232 may be pinned by the pinning layer 1231 in a fixed direction, and the magnetization direction of the reference layer 1232 is difficult to change. The magnetization direction of the reference layer 1232 is the same as the magnetization direction of the pinning layer 1231. Therefore, the magnetization direction of the reference layer 1232 is also parallel to the stacking direction of the layers in the MTJ. In addition, the pinning layer 1231 is configured to pin the magnetization direction of the reference layer 1232 in the fixed direction. Therefore, the magnetization direction of the pinning layer 1231 should not be prone to change, in other words, the pinning layer 1231 should have a large coercive field. However, the reference layer 1232 and the free layer 1234 are in a decoupled state due to an effect of the tunneling layer 1233. Therefore, a magnetization direction of the free layer 1234 is prone to change under an effect of an external magnetic field, and the magnetization direction of the free layer 1234 may be parallel to or oppositely parallel to the magnetization direction of the reference layer 1232, in other words, the magnetization direction of the free layer 1234 may be the same as or opposite to the magnetization direction of the reference layer 1232.

Based on the foregoing descriptions, because magnetization directions of the pinning layer 1231, the reference layer 1232, and the free layer 1234 are all parallel to the stacking direction of the layers in the MTJ, the MTJ in this embodiment of this application is an MTJ with perpendicular magnetic anisotropy (perpendicular magnetic anisotropy, PMA).

The reference layer 1232 and the free layer 1234 are magnetic layers. For example, materials of the reference layer 1232 and the free layer 1234 include one or more of a cobalt-ferroboron (CoFeB) alloy, a ferrocobalt (CoFe) alloy, or a nickel-ferrocobalt (NiFeCo) alloy. For example, the materials of the reference layer 1232 and the free layer 1234 are the CoFeB alloy. Specifically, the materials of the reference layer 1232 and the free layer 1234 may be $(Co_xFe_{1-x})_{1-y}B_y$, where both x and y are between 0 and 0.30.

The tunneling layer 1233 is a non-magnetic layer. For example, a material of the tunneling layer 1233 includes one or more of magnesium oxide (MgO) or aluminum oxide ($Al_2O_3$).

To facilitate growth of the pinning layer 1231, in some embodiments, as shown in FIG. 3*b*, the MTJ element 12 further includes a seed (seed) layer 1235 disposed between the second electrode 122 and the pinning layer 1231, and the pinning layer 1231 may be grown on the seed layer 1235.

A material of the reference layer 1232 is usually in a 001 lattice orientation, and a material of the pinning layer 1231 is usually in a 111 lattice orientation. In view of this, because a lattice difference between the reference layer 1232 and the pinning layer 1231 is large, it is difficult to grow the reference layer 1232 on the pinning layer 1231, and roughness accumulation, stress accumulation, and the like are caused. Based on this, in some embodiments, as shown in FIG. 3*b*, the MTJ element 12 further includes a structure conversion layer 1236 disposed between the reference layer 1232 and the pinning layer 1231, and a material of the structure conversion layer 1236 is an amorphous material.

The material of the structure conversion layer 1236 disposed between the reference layer 1232 and the pinning layer 1231 is the amorphous material, and the amorphous material has no fixed lattice orientation. Therefore, growing the reference layer 1232 on the structure conversion layer 1236 can avoid a growth difficulty caused by a lattice difference, and avoid problems such as roughness accumulation and stress accumulation.

For example, the material of the structure conversion layer 1236 is one or more of tantalum (Ta), a tantalum alloy, or a tantalum-tungsten alloy. The tantalum is an amorphous material.

On this basis, in some embodiments, as shown in FIG. 3*b*, the MTJ element 12 further includes a capping (capping) layer 1237 that is in contact with the free layer 1234 and that is disposed on a side that is of the free layer 1234 and away from the tunneling layer 1233. Herein, after the capping layer 1237 is added, an interface between the capping layer 1237 and the free layer 1234 helps increase perpendicular magnetic anisotropy of the free layer 1234, so that data storage time can be prolonged.

For example, a material of the capping layer 1237 includes magnesium oxide.

It should be understood that the tunneling layer 1233 is located between the reference layer 1232 and the free layer 1234. When data stored in the MTJ element 12 is read, more than 90% of tunnel magneto resistance (tunneling magneto resistance, TMR) of the MTJ element 12 is from the tunneling layer 1233. Therefore, resistance of the tunneling layer 1233 should be set to be large. In addition, the capping layer 1237 is located on the side that is of the free layer 1234 and that is away from the tunneling layer 1233, and in addition to increasing the perpendicular magnetic anisotropy of the free layer 1234, the capping layer 1237 is further configured to transmit a current. Therefore, resistance of the capping layer 1237 should be set to be small. In other words, the resistance of the tunneling layer 1233 is far greater than the resistance of the capping layer 1237. When both the material of the tunneling layer 1233 and the material of the capping layer 1237 are magnesium oxide, because the resistance of the tunneling layer 1233 is far greater than the resistance of the capping layer 1237, thickness of the capping layer 1237 may be adjusted to be small, so that the resistance of the capping layer 1237 is small. Certainly, magnesium oxide may alternatively be formed in a manner of magnesium oxidation and growth, and resistance of the formed magnesium oxide is small. A key to implementing reading/writing of the magnetic random access memory is that the magnetic random access memory has large tunnel magneto resistance and has high spin transfer efficiency. The foregoing MTJ structure in this application can obtain large tunnel magneto resistance (ranging from 150% to 250%) and has high spin transfer efficiency (>0.8). Therefore, reading and writing functions can be ensured.

Based on the structure of the memory 10, the following uses a storage unit 11 as an example to describe a working process of the memory 10.

When the storage unit 11 performs writing, the transistor T is in a conducted state. When a current flows from the free layer 1234 to the reference layer 1232, to be specific, a spin electron flows from the reference layer 1232 to the free layer 1234, and the spin electron passes through the reference layer 1232, the electron in the current is spin-polarized along the magnetization direction of the reference layer 1232, and a spin magnetic moment of the electron is parallel to the magnetization direction of the reference layer 1232. When the electron passes through the tunneling layer 1233 and reaches the free layer 1234, the spin electron transfers a spin moment (also referred to as a spin angular momentum, namely, an STT) to the free layer 1234, and the free layer 1234 subject to a spin moment effect has small magnetization strength. Therefore, the magnetization direction of the free layer 1234 can freely change based on a polarization direction of the spin electron in the spin current, and finally the magnetization direction of the free layer 1234 is parallel to the magnetization direction of the reference layer 1232, in other words, the magnetization direction of the free layer 1234 is the same as the magnetization direction of the reference layer 1232, which may indicate that written information is "0".

When a current flows from the reference layer 1232 to the free layer 1234, to be specific, spin electrons flow from the free layer 1234 to the reference layer 1232, the spin electrons perform exchange coupling with a magnetic moment in the reference layer 1232, so that an electron that spins parallel to the magnetization direction of the reference layer 1232 passes through, and an electron that spins oppositely parallel to the magnetization direction of the reference layer 1232 is reflected. The reflected electron passes through the tunneling layer 1233 and reaches the free layer 1234, and performs exchange coupling with a magnetic moment of the free layer 1234, so that the magnetization direction of the free layer 1234 rotates in a direction opposite to the magnetization direction of the reference layer 1232, and finally the magnetization direction of the free layer 1234 is oppositely parallel to the magnetization direction of the reference layer 1232, in other words, the magnetization direction of the free layer 1234 is opposite to the magnetization direction of the reference layer 1232, which may indicate that written information is "1". A direction of the current herein may be controlled by using voltages provided by the bit line BL and the source line SL. When a voltage provided by the bit line BL is greater than a voltage provided by the source line SL, the current flows from the free layer 1234 to the reference layer 1232; or when a voltage provided by the bit line BL is less than a voltage provided by the source line SL, the current flows from the reference layer 1232 to the free layer 1234.

When the storage unit 11 performs reading, a constant small current flows out from the bit line BL to the drain of the conducted transistor T through the MTJ, and a potential difference is generated at two ends of the MTJ. Resistance of the MTJ may be determined based on a value of the potential difference, in other words, a relative orientation relationship between the magnetization direction of the free layer 1234 and the magnetization direction of the reference layer 1232 may be obtained, to determine that information stored in the storage unit 11 is "0" or "1". Specifically, if the MTJ presents low resistance, the magnetization direction of the free layer 1234 is parallel to the magnetization direction of the reference layer 1232, and information stored in the storage unit 11 is "0". If the MTJ presents high resistance, the magnetization direction of the free layer 1234 is oppositely parallel to the magnetization direction of the reference layer 1232, and information stored in the storage unit 11 is "1".

It should be understood that, when the memory 10 stores information and reads information, the word line control circuit provides a gating signal to the word lines row by row, so that transistors T in a plurality of rows of storage units 11 are conducted row by row, and information can be written or read row by row.

Based on a working principle of the storage unit 11, the memory 10 provided in this embodiment of this application may also be referred to as a spin transfer torque magnetic random access memory.

Figure 4A:
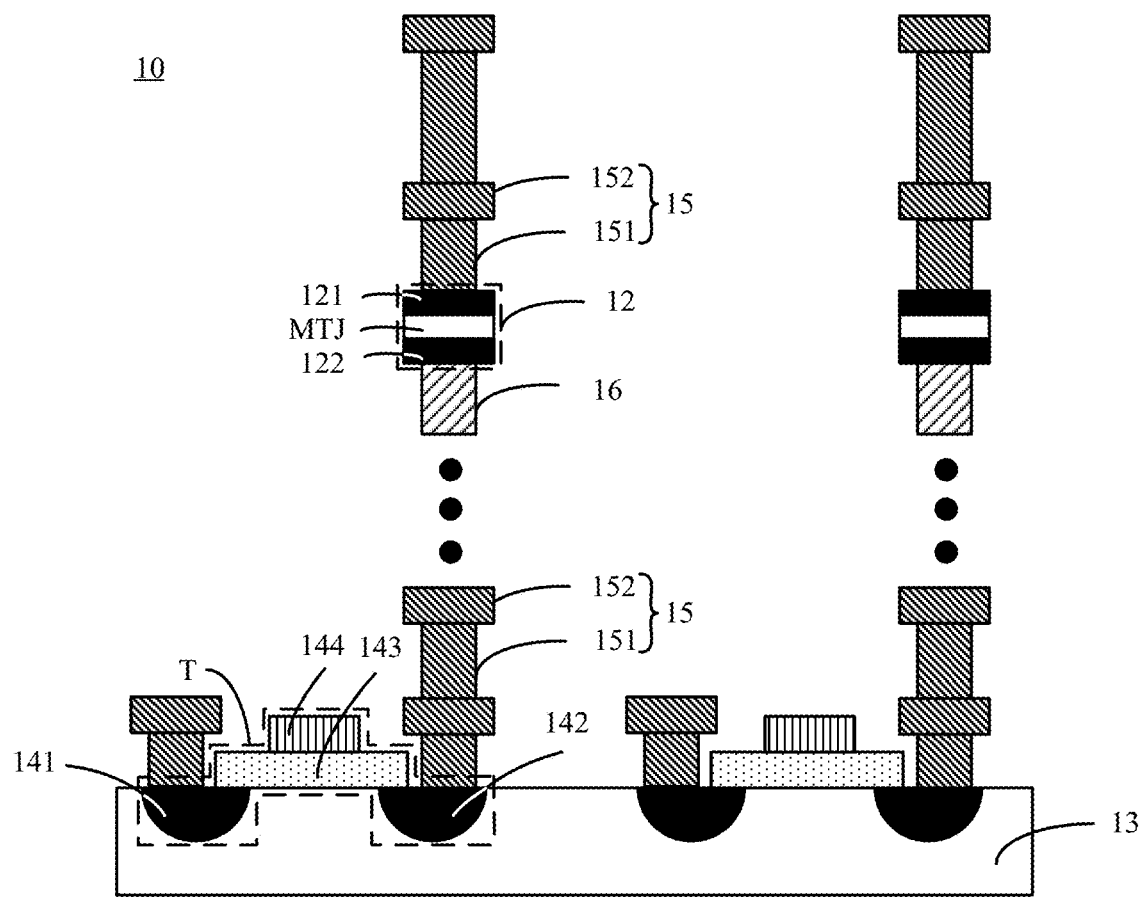
FIG. 4a is a schematic structural diagram of a memory according to another embodiment of this application.
Figure 5A:
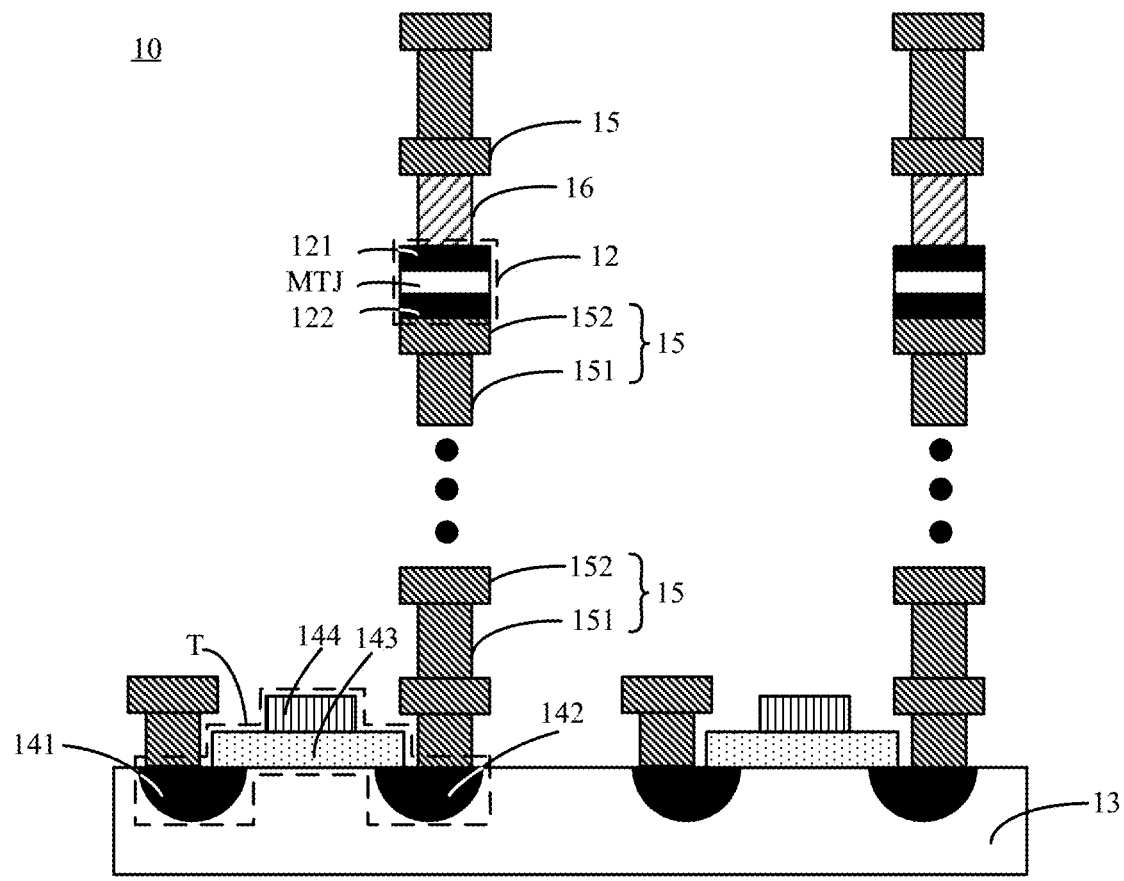
FIG. 5a is a schematic structural diagram of a memory according to still another embodiment of this application.
Figure 6A:
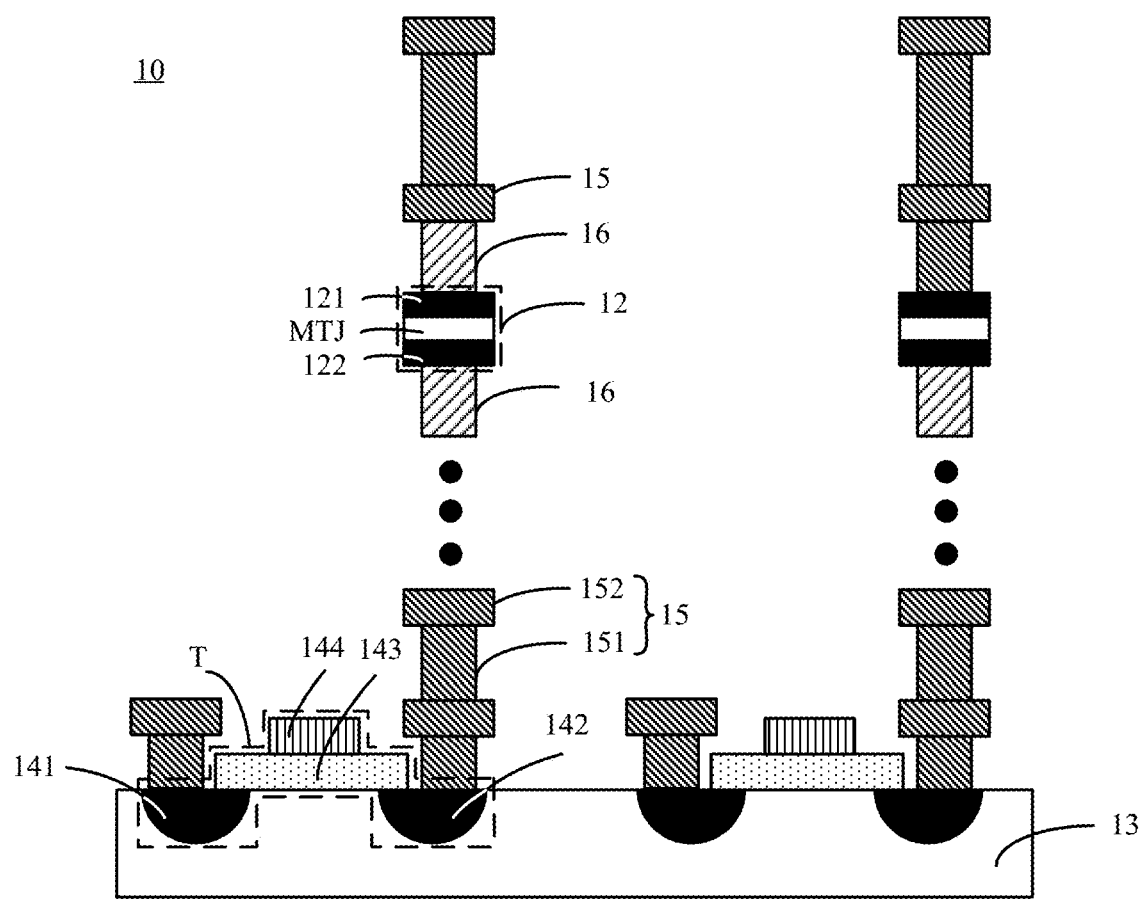
FIG. 6a is a schematic structural diagram of a memory according to yet another embodiment of this application.

With reference to FIG. 4a, FIG. 5a, and FIG. 6a, the memory 10 may further include a substrate 13. The transistor T, the MTJ element 12, and another pattern are all disposed on the substrate 13. In FIG. 4a, FIG. 5a, and FIG. 6a, an example in which the transistor is a MOS transistor is used for illustration. A source 141, a drain 142, an active layer 143, and a gate 144 of the transistor T are illustrated, and a gate insulation layer disposed between the gate 144 and the active layer 143 is not illustrated.

It should be understood that, in a manufacturing process of the memory 10, after the transistor T is manufactured on the substrate 13, the MTJ element 12 is not directly manufactured. Usually, after the transistor T is manufactured and before the MTJ element 12 is manufactured, another conductive functional pattern and an insulation layer (FIG. 4a, FIG. 5a, and FIG. 6a do not show the conductive functional pattern and the insulation layer) are further formed. Based on this, to electrically connect the drain 142 of the transistor T to the second electrode 122 of the MTJ element 12, as shown in FIG. 4a, FIG. 5a, and FIG. 6a, on a current transmission path between the drain 142 of the transistor T and the MTJ element 12, at least one conductive structure 15 (also referred to as a conductive tube or a metal conductive tube) is connected in series between the second electrode 122 and the drain 142 of the transistor T, and the second electrode 122 is electrically connected to the drain 142 of the transistor T by using the at least one conductive structure 15. Similarly, after the MTJ element 12 is manufactured and before the bit line BL is manufactured, a conductive functional pattern and an insulation layer are also formed. Based on this, to electrically connect the first electrode 121 to the bit line BL, as shown in FIG. 4a, FIG. 5a, and FIG. 6a, on a current transmission path between the MTJ element 12 and the bit line BL, at least one conductive structure 15 is connected in series between the first electrode 121 and the bit line BL, and the first electrode 121 is electrically connected to the bit line BL by using the at least one conductive structure 15. The conductive structure 15 and the conductive functional pattern may be synchronously formed.

Based on this, as shown in FIG. 4a, FIG. 5a, and FIG. 6a, the memory 10 provided in this embodiment of this application further includes a first magnetic structure 16 disposed on the current transmission path and in contact with the MTJ element 12. An included angle between a magnetization direction of the first magnetic structure 16 and the magnetization direction of the pinning layer 1231 is (90°, 180° ]. In other words, the included angle between the magnetization direction of the first magnetic structure 16 and the magnetization direction of the pinning layer 1231 is greater than 90° and less than or equal to 180°.

Compared with a current technology, in this embodiment of this application, the first magnetic structure 16 in contact with the MTJ element 12 is added to the current transmission path between the source 141 or the drain 142 of the transistor T and the bit line BL.

It should be understood that the first magnetic structure 16 is conductive because the first magnetic structure 16 is disposed on the current transmission path between the source 141 or the drain 142 of the transistor T and the bit line BL.

Figure 4B:
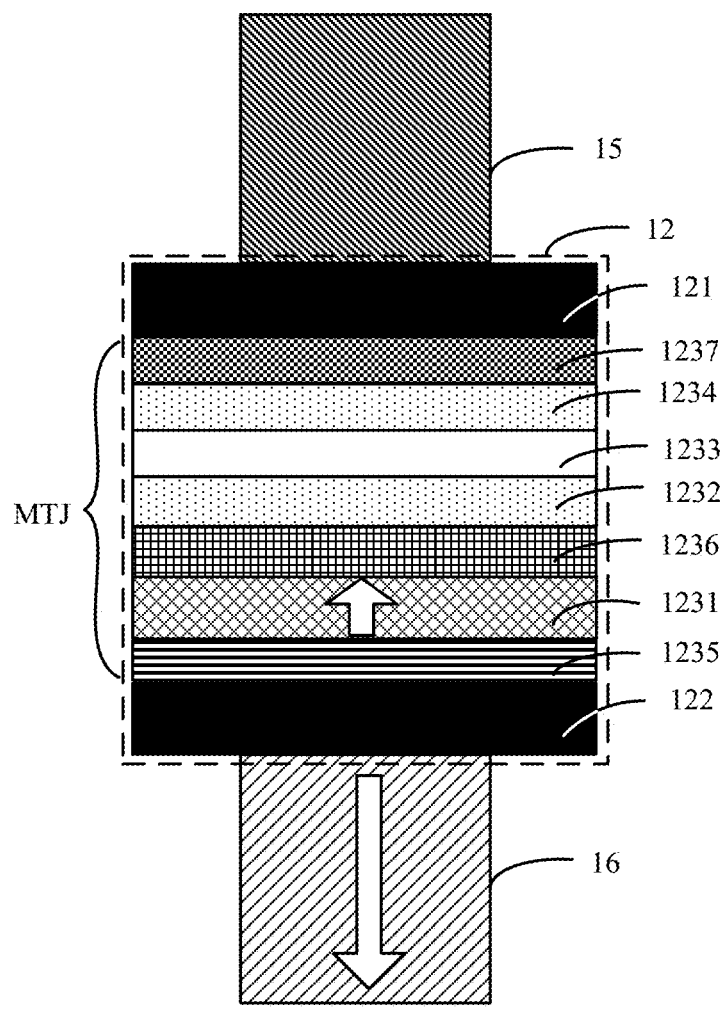
FIG. 4b is a schematic structural diagram of an MTJ element, a conductive structure, and a first magnetic structure according to an embodiment of this application.
Figure 5B:
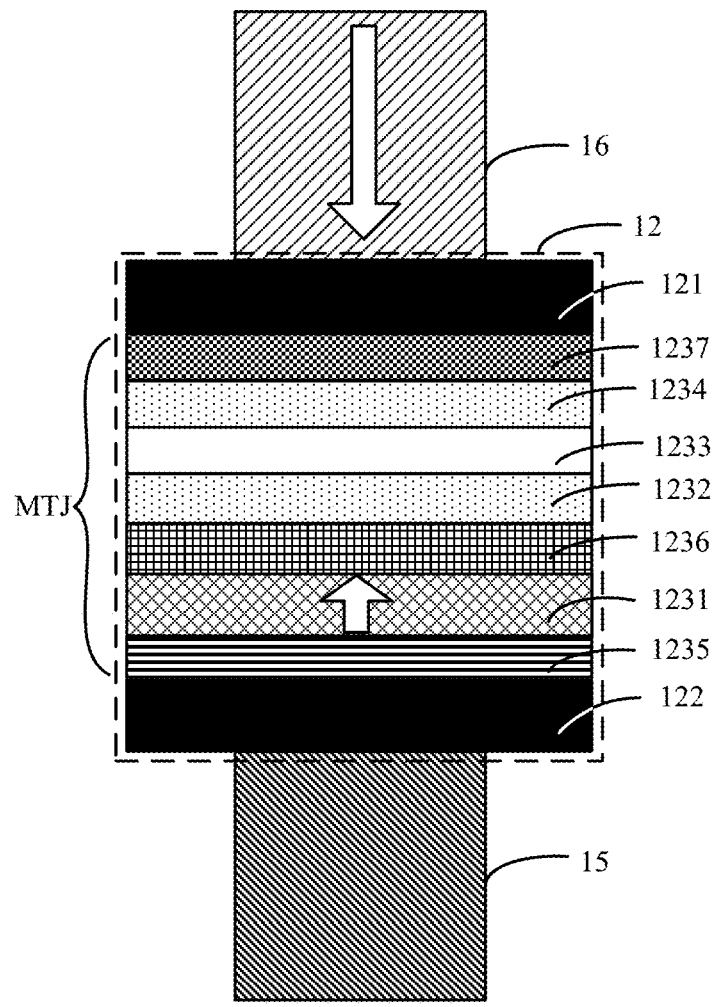
FIG. 5b is a schematic structural diagram of an MTJ element, a conductive structure, and a first magnetic structure according to another embodiment of this application.
Figure 6B:
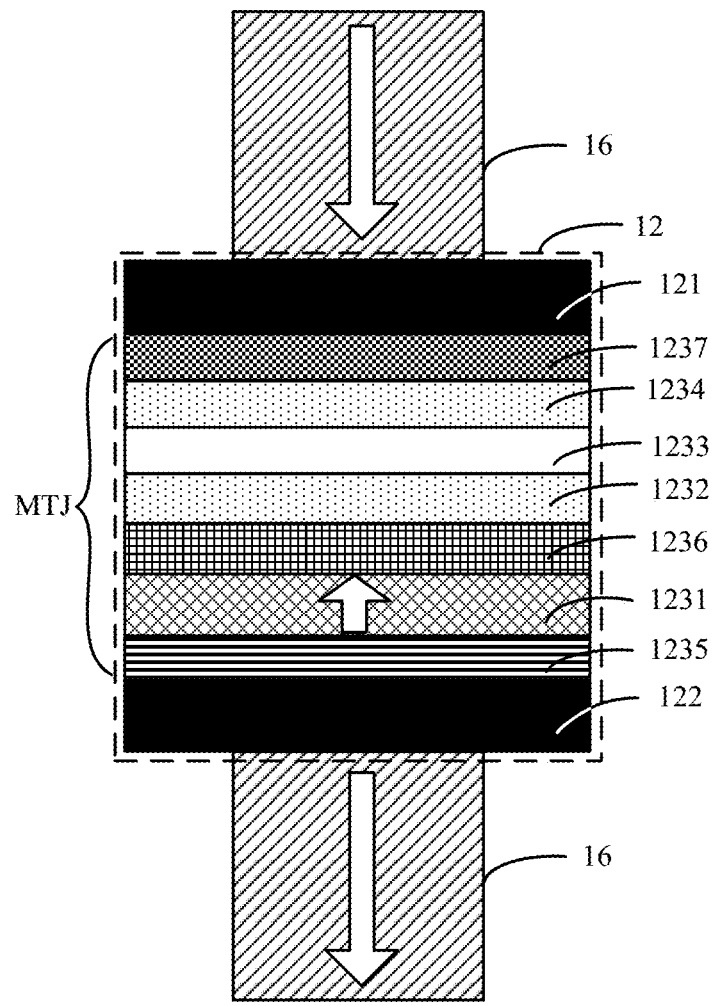
FIG. 6b is a schematic structural diagram of an MTJ element and a first magnetic structure according to an embodiment of this application.

Herein, the memory 10 may include one first magnetic structure 16 that is in contact with the MTJ element 12. In this case, as shown in FIG. 4a and FIG. 4b, the first magnetic structure 16 is connected between the MTJ element 12 and the source 141 or the drain 142 of the transistor T. Alternatively, as shown in FIG. 5a and FIG. 5b, the first magnetic structure 16 is connected between the MTJ element 12 and the bit line BL. The memory 10 may alternatively include two first magnetic structures 16 that are in contact with the MTJ element 12. In this case, as shown in FIG. 6a and FIG. 6b, one first magnetic structure 16 is connected between the MTJ element 12 and the source 141 or the drain 142 of the transistor T, and the other first magnetic structure 16 is connected between the MTJ element 12 and the bit line BL.

Figure 7:
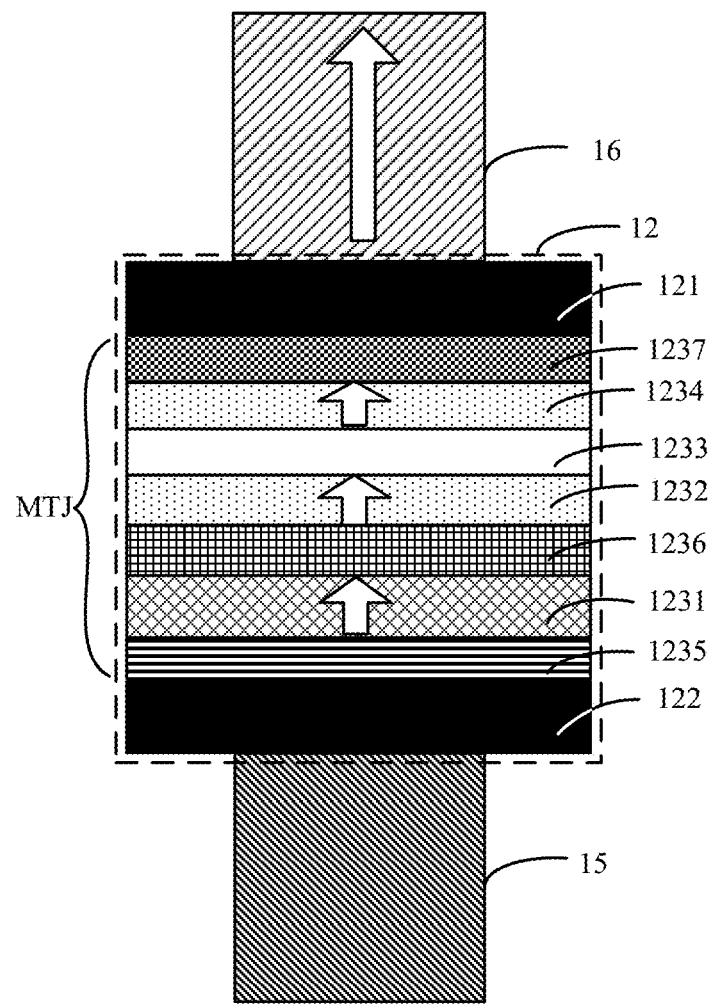
FIG. 7 is a schematic structural diagram of an MTJ element and a first magnetic structure before initialization according to an embodiment of this application.

It should be understood that, before the memory 10 is delivered from a factory, magnetization directions of the layers in the MTJ need to be initialized. To ensure that the included angle between the magnetization direction of the first magnetic structure 16 and the magnetization direction of the pinning layer 1231 is (90°, 180° ] after initialization, coercive force of the first magnetic structure 16 is different from coercive force of the pinning layer 1231. For example, the first magnetic structure 16 is connected between the MTJ element 12 and the bit line BL, the first magnetic structure 16 is in contact with the first electrode 121 in the MTJ element 12, and the magnetization direction of the first magnetic structure 16 is opposite to the magnetization direction of the pinning layer 1231 after initiation. A specific process of initializing the MTJ is as follows: First, as shown in FIG. 7, a large first external magnetic field is applied, to enable magnetization directions of the pinning layer 1231, the reference layer 1232, the free layer 1234, and the first magnetic structure 16 to be the same. Then, as shown in FIG. 5b, a small second external magnetic field is applied, where a magnetic field direction of the first external magnetic field is opposite to a magnetic field direction of the second external magnetic field, and the second external magnetic field enables a magnetization direction of a layer with small coercive force to be flipped in an opposite direction, so that the magnetization direction of the first magnetic structure 16 is opposite to the magnetization direction of the pinning layer 1231. In FIG. 5b and FIG. 7, an example in which the coercive force of the first magnetic structure 16 is less than the coercive force of the pinning layer 1231 is used for illustration.

In some embodiments, a material of the first magnetic structure 16 includes one or more of monatomic cobalt (Co), monatomic iron (Fe), monatomic nickel (Ni), and an alloy including at least one of cobalt, iron, or nickel.

The alloy including at least one of cobalt, iron, or nickel may be, for example, a CoB (cobalt-boron) alloy or a FeB (ferro-boron) alloy.

It may be understood that a material of the conductive structure 15 in the memory 10 is a non-magnetic material, for example, copper (Cu).

In some embodiments of this application, the first magnetic structure 16 may be formed by using a hole filling process. A specific process is as follows: First, an insulation layer is formed, where the insulation layer includes a via (via). Then, a magnetic film is deposited. Next, a magnetic film outside the via is polished, to form the first magnetic structure 16 in the via.

It should be noted that the conductive structure 15 in FIG. 4a, FIG. 5a, and FIG. 6a includes a first conductive part 151 and a second conductive part 152. A reason is as follows: When the conductive structure 15 is manufactured, an insulation layer is formed first, where the insulation layer includes a via. Next, a conductive film is formed, where a part, of the conductive film, deposited in the via of the insulation layer is referred to as the first conductive part 151. The conductive film is patterned to form the foregoing conductive functional pattern. In addition, a part formed after the conductive film deposited above the via is patterned is referred to as the second conductive part 152.

In addition, when the memory 10 includes a conductive structure 15 connected between the MTJ element 12 and the bit line BL and in contact with the MTJ element 12, the conductive structure 15 may be shown in FIG. 4a, and includes a first conductive part 151 and a second conductive part 152. For a specific manufacturing process, refer to the foregoing descriptions, and details are not described herein again.

When the memory 10 includes a conductive structure 15 connected between the MTJ element 12 and the source 141 or the drain 142 of the transistor T and in contact with the MTJ element 12, the conductive structure 15 may include a first conductive part 151, but does not include a second conductive part 152. A specific manufacturing process is as follows: First, an insulation layer is formed, where the insulation layer includes a via. Then, a conductive film is formed. Next, a conductive film outside the via is removed (for example, polished), and a part, of the conductive film, deposited in the via of the insulation layer forms the first conductive part 151, that is, the conductive structure 15. The conductive structure 15 may alternatively be shown in FIG. 5a, including a first conductive part 151 and a second conductive part 152. For a specific manufacturing process, refer to the foregoing descriptions. Details are not described herein again.

When the memory 10 includes the first magnetic structure 16 connected between the MTJ element 12 and the bit line BL and in contact with the MTJ element 12, after the first magnetic structure 16 is formed, a process of forming the conductive structure 15 may be shown in FIG. 5a and FIG. 6a. A conductive film is formed, and the conductive film is patterned to form the conductive structure 15. Alternatively, an insulation layer may be formed first, where the insulation layer includes a via. Then, a conductive film is formed, where a part, of the conductive film, deposited in the via of the insulation layer forms the first conductive part 151 of the conductive structure 15. The conductive film is patterned to form the foregoing conductive functional pattern, and a part formed after the conductive film deposited above the via is patterned is the second conductive part 152 of the conductive structure 15.

It may be understood that, because the included angle between the magnetization direction of the first magnetic structure 16 and the magnetization direction of the pinning layer 1231 is (90, 180° ], an included angle between a direction of a magnetic field generated by the first magnetic structure 16 at the free layer 1234 and a direction of a magnetic field (also referred to as a static magnetic field or a stray field) generated by the pinning layer 1231 at the free layer 1234 is (90, 180° ].

In addition, when the included angle between the direction of the magnetic field generated by the first magnetic structure 16 at the free layer 1234 and the direction of the magnetic field generated by the pinning layer 1231 at the free layer 1234 is 180°, that is, when the direction of the magnetic field generated by the first magnetic structure 16 at the free layer 1234 is opposite to the direction of the magnetic field generated by the pinning layer 1231 at the free layer 1234, the magnetic field generated by the first magnetic structure 16 at the free layer 1234 can cancel the magnetic field generated by the pinning layer 1231 at the free layer 1234, so that impact of the magnetic field generated by the pinning layer 1231 at the free layer 1234 on the free layer 1234 can be reduced. When the included angle between the direction of the magnetic field generated by the first magnetic structure 16 at the free layer 1234 and the direction of the magnetic field generated by the pinning layer 1231 at the free layer 1234 is (90°, 180°), in a direction opposite to the magnetization direction of the pinning layer 1231, the first magnetic structure 16 generates a magnetic field component at the free layer 1234, and the magnetic field component that is generated by the first magnetic structure 16 at the free layer 1234 and that is along the direction opposite to the magnetization direction of the pinning layer 1231 may cancel the magnetic field generated by the pinning layer 1231 at the free layer 1234.

It should be noted that, to ensure that the magnetization direction of the first magnetic structure 16 can remain unchanged after an external magnetic field is removed, for example, the magnetization direction of the first magnetic structure 16 is parallel to the stacking direction of the layers in the MTJ, in other words, to enable the first magnetic structure 16 to have magnetic shape anisotropy, a length of the first magnetic structure 16 along a direction parallel to the stacking direction of the layers in the MTJ is greater than or equal to a length of the first magnetic structure 16 along a direction perpendicular to the stacking direction of the layers in the MTJ. When the first magnetic structure 16 is a cylinder, a height of the first magnetic structure 16 is greater than or equal to a diameter of the first magnetic structure 16.

An embodiment of this application provides a memory 10. The memory 10 includes a plurality of storage units 11 and bit lines BLs. The storage unit 11 includes a transistor T and an MTJ element 12 connected to the transistor T. The MTJ element 12 is disposed on a current transmission path between a source 141 or a drain 142 of the transistor T and the bit line BL. The MTJ element 12 includes a pinning layer 1231, a reference layer 1232, a tunneling layer 1233, and a free layer 1234 that are stacked in sequence. A magnetization direction of the pinning layer 1231 is parallel to a stacking direction of layers in the MTJ. The memory 10 further includes a first magnetic structure 16 disposed on the current transmission path and in contact with the MTJ element 12. An included angle between a magnetization direction of the first magnetic structure 16 and the magnetization direction of the pinning layer 1231 is (90°, 180° ]. Because the included angle between the magnetization direction of the first magnetic structure 16 and the magne-tization direction of the pinning layer 1231 is (90°, 180° ], a magnetic field generated by the first magnetic structure 16 at the free layer 1234 can cancel a magnetic field generated by the pinning layer 1231 at the free layer 1234, so that a compensation field generated by the free layer 1234 can be reduced or eliminated. In this way, a current required for flipping the free layer 1234 is reduced, and a problem of flipping asymmetry (to be specific, magnitudes of currents required when a magnetization direction of the free layer is enabled to change to two opposite directions are different) in the MTJ can be resolved. In addition, because the magnetic field generated by the pinning layer 1231 at the free layer 1234 may be canceled by the magnetic field generated by the first magnetic structure 16 at the free layer 1234, a difference caused by impact of a stray field on the free layer 1234 does not need to be overcome by increasing a current. In this way, the magnetization direction of the free layer 1234 can be flipped by using a small current, so that power can be reduced, durability of the MTJ can be improved, and a lifespan of the MTJ can be improved.

In some embodiments, the magnetization direction of the first magnetic structure 16 is opposite to the magnetization direction of the pinning layer 1231, in other words, the included angle between the magnetization direction of the first magnetic structure 16 and the magnetization direction of the pinning layer 1231 is 180°, and a magnitude of the magnetic field generated by the first magnetic structure 16 at the free layer 1234 is the same as that of the magnetic field generated by the pinning layer 1231 at the free layer 1234.

When the magnetization direction of the first magnetic structure 16 is opposite to the magnetization direction of the pinning layer 1231, and the magnitude of the magnetic field generated by the first magnetic structure 16 at the free layer 1234 is the same as that of the magnetic field generated by the pinning layer 1231 at the free layer 1234, the magnetic field generated by the first magnetic structure 16 at the free layer 1234 can cancel the magnetic field generated by the pinning layer 1231 at the free layer 1234. Therefore, a magnetic field, generated by another layer, applied to the free layer 1234 is zero or approaches zero, and a compensation field generated by the free layer 1234 due to the magnetic field generated by the another layer is zero or approaches zero. This further reduces the current required for flipping the free layer 1234, and more effectively resolves the problem of flipping asymmetry in the MTJ.

Considering that the reference layer 1232 may also generate a stray field at the free layer 1234, to prevent the stray field generated by the reference layer 1232 at the free layer 1234 from increasing the current required for flipping the free layer 1234, in some embodiments, the magnetization direction of the first magnetic structure 16 is opposite to the magnetization direction of the pinning layer 1231. In addition, the magnitude of the magnetic field generated by the first magnetic structure 16 at the free layer 1234 is the same as magnitudes of magnetic fields generated by the pinning layer 1231 and the reference layer 1232 at the free layer 1234. In this way, both the magnetic fields generated by the pinning layer 1231 and the reference layer 1232 at the free layer 1234 can be canceled by the magnetic field generated by the first magnetic structure 16 at the free layer 1234. This further reduces the current required for flipping the free layer 1234.

Figure 8A:
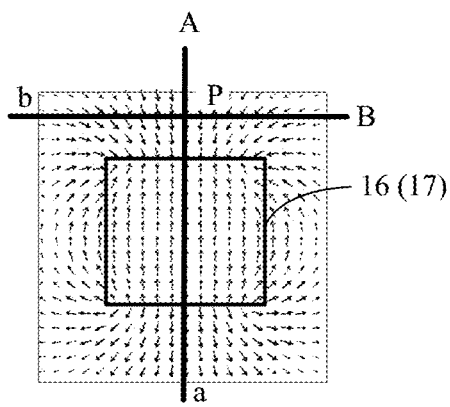
FIG. 8a is a schematic diagram of a direction of a magnetic field in a first magnetic structure or a second magnetic structure and a direction of a magnetic field outside the first magnetic structure or the second magnetic structure according to an embodiment of this application.
Figure 8B:
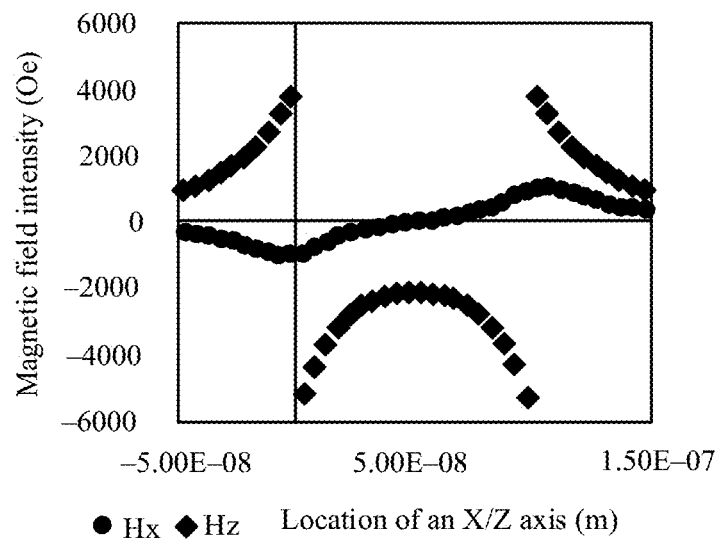

Refer to FIG. 8a and FIG. 8b. FIG. 8a is a schematic diagram of simulation. A block in FIG. 8a represents the first magnetic structure 16. The magnetization direction of the first magnetic structure 16 is parallel to the stacking direction of the layers in the MTJ. FIG. 8a shows a direction of a magnetic field in the first magnetic structure 16 and a direction of a stray field generated externally. In FIG. 8a, an arrow is used to represent a magnetic field direction of space in which the first magnetic structure 16 is located, and the magnetic field direction of the space in which the first magnetic structure 16 is located includes the direction of the magnetic field in the first magnetic structure 16 and the direction of the stray field generated externally. In FIG. 8a, a black straight line A is parallel to the stacking direction of the layers in the MTJ, and a direction of a magnetic field in a central area of the first magnetic structure 16 is parallel to the stacking direction of the layers in the MTJ. It can be learned along a location shown by the black straight line A in FIG. 8a that the direction of the magnetic field in the first magnetic structure 16 is opposite to the direction of the stray field generated externally. FIG. 8b is a simulation result diagram of locations shown by a black straight line A (that is, a Z axis) and a black straight line B (that is, an X axis) in FIG. 8a. A horizontal coordinate represents a location of the X axis or the Z axis, where a point a in FIG. 8a represents that a location of the Z axis is −5.00E-08, and a point b in FIG. 8a represents that a location of the X axis is −5.00E-08. A vertical coordinate in FIG. 8b represents magnetic field (magnetic field) intensity, where a unit is oersted (Oe). It can be learned from FIG. 8b of a change of magnetic field intensity Hx along the X axis and a change of magnetic field intensity Hz along the Z axis. For example, the MTJ is located above the first magnetic structure 16. A location P in FIG. 8a represents a location of the free layer 1234, and a location of the free layer 1234 on the Z axis is 20 nm. It can be learned from a simulation result provided in FIG. 8b that the first magnetic structure 16 generates a stray field of approximately 900 Oe to 2000 Oe at the location P, and a direction of the stray field is opposite to the direction of the magnetic field in the first magnetic structure 16. Based on this, the stray field generated by the first magnetic structure 16 may be used to cancel the stray field generated by the pinning layer 1231.

Figure 9:
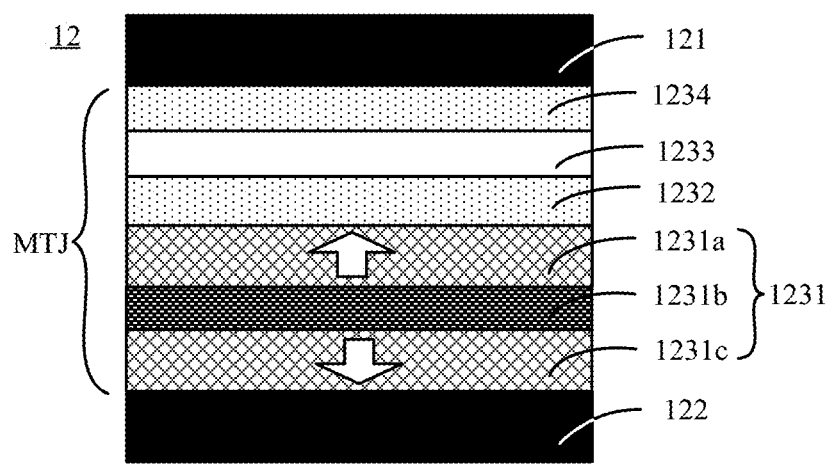
FIG. 9 is a schematic structural diagram of an MTJ element.

In a current technology, to avoid problems such as a large current required for flipping the free layer 1234 in the MTJ and flipping asymmetry in the MTJ that are caused by a large compensation field of the free layer 1234 caused by a strong stray field generated by the pinning layer 1231, as shown in FIG. 9, an artificial antiferromagnetic layer is used for the pinning layer 1231. The artificial antiferromagnetic layer includes a first pinning sub-layer 1231a, a non-magnetic layer 1231b, and a second pinning sub-layer 1231c that are stacked, and magnetization directions of the first pinning sub-layer 1231a and the second pinning sub-layer 1231c are opposite. The first pinning sub-layer 1231a is more close to the reference layer 1232 relative to the second pinning sub-layer 1231c, and a magnetization direction of the reference layer 1232 is the same as a magnetization direction of the first pinning sub-layer 1231a. Because the magnetization directions of the first pinning sub-layer 1231a and the second pinning sub-layer 1231c are opposite, the stray field generated by the pinning layer 1231 may approach 0. In this way, the problems of the large current required for flipping the free layer 1234 and the flipping asymmetry in the MTJ can be avoided.

Figure 10:
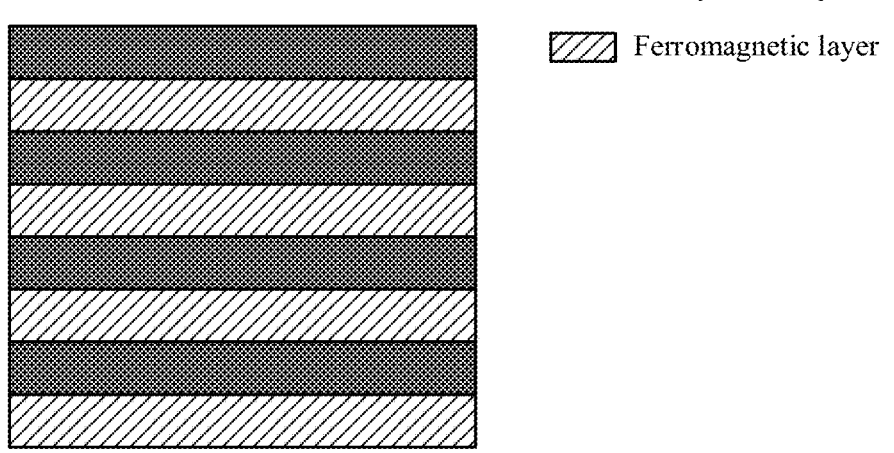
FIG. 10 is a schematic structural diagram of a first pinning sub-layer, a second pinning sub-layer, or a pinning layer in an MTJ element.

However, as shown in FIG. 10, because both the first pinning sub-layer 1231a and the second pinning sub-layer 1231c are formed by a plurality of layers of films that are alternately stacked by a ferromagnetic (ferromagnetic, FM) layer such as a cobalt (Co) layer and a heavy metal (heavy metal, HM) layer such as a platinum (Pt) layer, a structure of the pinning layer 1231 is complex, roughness or stress accumulation is easily caused, and thickness of the MTJ is large, which are not conducive to miniaturization of the MTJ. In addition, thickness of the pinning layer 1231 is large, and the pinning layer 1231 is a conductive material, in other words, thickness of a conductive material below the tunneling layer 1233 is large. In this way, resputtering is easily caused in an etching process, and the conductive material is sputtered to a side surface of the tunneling layer 1233. Therefore, an MTJ short circuit is caused, and an engineering yield is reduced.

In this embodiment of this application, the stray field generated by the pinning layer 1231 at the free layer 1234 may be canceled by the stray field generated by the first magnetic structure 16 at the free layer 1234. Therefore, the thickness of the pinning layer 1231 may be set to be small. Based on this, to reduce the thickness of the pinning layer 1231, in some embodiments of this application, as shown in FIG. 10, the pinning layer 1231 includes a ferromagnetic layer and a heavy metal layer (that is, a non-magnetic layer) that are alternately stacked along the stacking direction of the layers in the MTJ.

In some embodiments, a material of the ferromagnetic layer includes one or more of monatomic cobalt, monatomic iron, monatomic nickel, and an alloy including at least one of cobalt, iron, or nickel.

In some embodiments, a material of the heavy metal layer includes one or more of monatomic platinum (Pt), monatomic tantalum, monatomic copper (Cu), monatomic iridium (Ir), monatomic ruthenium (Ru), monatomic tungsten (W), and an alloy including at least one of platinum, tantalum, copper, iridium, ruthenium, or tungsten.

For example, the pinning layer 1231 includes a cobalt layer and a platinum layer ([Co/Pt]n, where n is a positive integer, and represents a quantity of cobalt layers or a quantity of platinum layers) that are alternately stacked along the stacking direction of the layers in the MTJ.

Compared with the current technology in which the pinning layer 1231 includes the first pinning sub-layer 1231a, the non-magnetic layer 1231b, and the second pinning sub-layer 1231c, and the first pinning sub-layer 1231a and the second pinning sub-layer 1231c each include a ferromagnetic layer and a heavy metal layer that are alternately stacked along the stacking direction of the layers in the MTJ, in this embodiment of this application, because the stray field generated by the pinning layer 1231 at the free layer 1234 may be canceled by the stray field generated by the first magnetic structure 16 at the free layer 1234, the pinning layer 1231 may include only the ferromagnetic layer and the heavy metal layer that are alternately stacked along the stacking direction of the layers in the MTJ, in other words, the pinning layer 1231 in this embodiment of this application includes only the first pinning sub-layer 1231a in the current technology. Therefore, compared with the current technology, in this embodiment of this application, the thickness of the pinning layer 1231 is greatly reduced, and a structure is simplified. This helps reduce roughness of an interface between the tunneling layer 1233 and the free layer 1234, reduce stress accumulation, and facilitate miniaturization of the MTJ. In addition, because the thickness of the pinning layer 1231 is greatly reduced, in other words, thickness of a conductive material below the tunneling layer 1233 is reduced, a probability of a short circuit caused by resputtering in an etching process is reduced, and an engineering yield is improved.

In some other embodiments of this application, a material of the pinning layer 1231 is a perpendicular magnetic anisotropy material.

When the material of the pinning layer 1231 is the perpendicular magnetic anisotropy material, in some embodiments, the material of the pinning layer 1231 includes one or more of a ferroplatinum (FePt) alloy and a cobalt-platinum (CoPt) alloy.

Because the material of the pinning layer 1231 is the perpendicular magnetic anisotropy material, the magnetization direction of the pinning layer 1231 is easily magnetized to be parallel to the stacking direction of the layers in the MTJ. In this way, thickness of the pinning layer 1231 may be set to be small. Therefore, compared with a current technology, in this embodiment of this application, the thickness of the pinning layer 1231 is greatly reduced, and a structure is simplified. This helps reduce roughness of an interface between the tunneling layer 1233 and the free layer 1234, reduce stress accumulation, and facilitate miniaturization of the MTJ. In addition, because the thickness of the pinning layer 1231 is greatly reduced, in other words, thickness of a conductive material below the tunneling layer 1233 is reduced, a probability of a short circuit caused by resputtering in an etching process is reduced, and an engineering yield is improved.

Figure 11A:
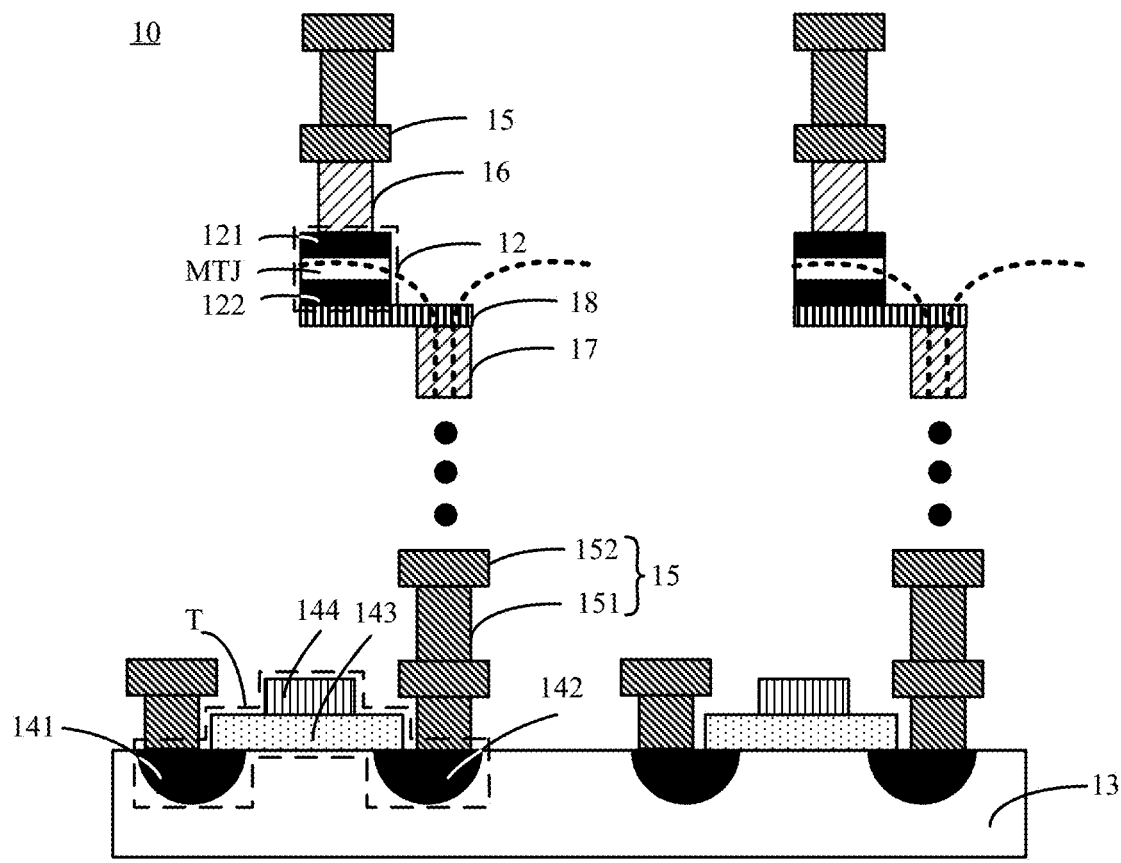
FIG. 11a is a schematic structural diagram of a memory according to still yet another embodiment of this application.
Figure 12A:
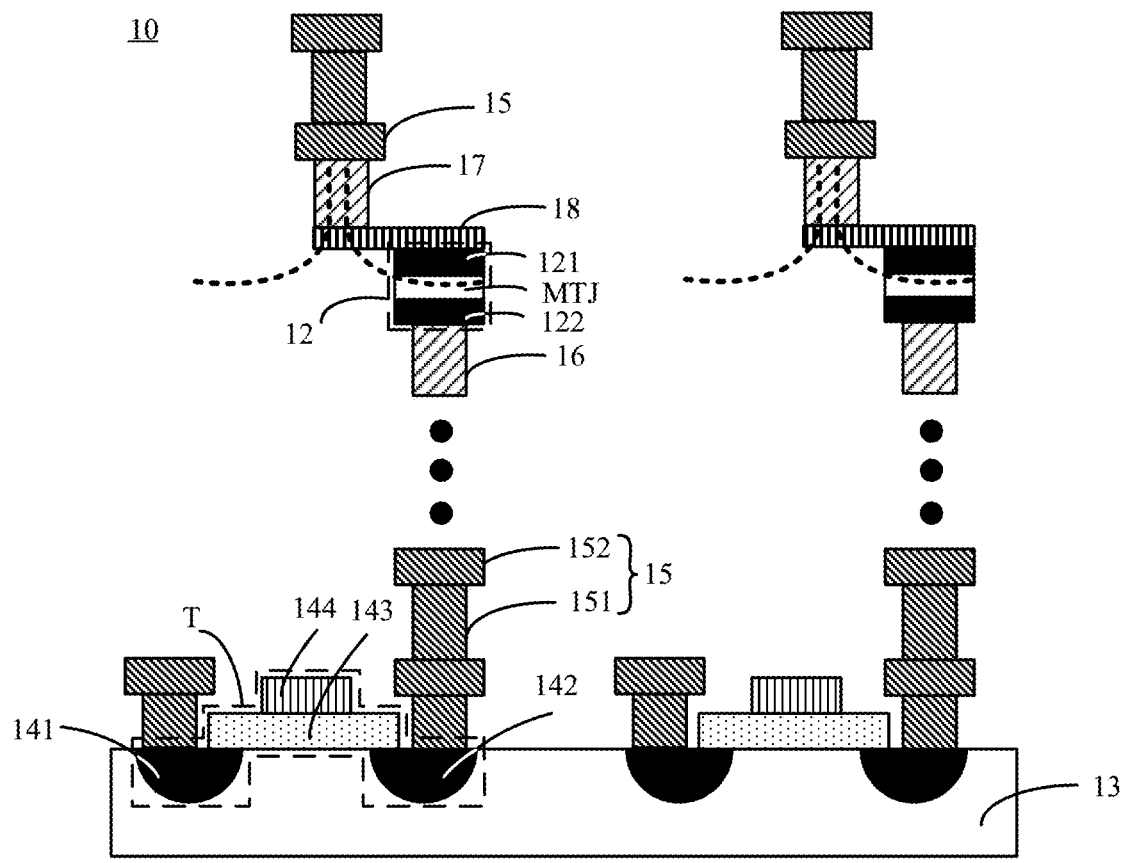
FIG. 12a is a schematic structural diagram of a memory according to a further embodiment of this application.

Based on the foregoing descriptions, in some embodiments, as shown in FIG. 11*a* and FIG. 12*a*, the memory 10 further includes a second magnetic structure 17 disposed on the current transmission path, and a direction of a magnetic field generated by the second magnetic structure 17 at the free layer 1234 is not parallel to the magnetization direction of the free layer 1234.

Figure 11B:
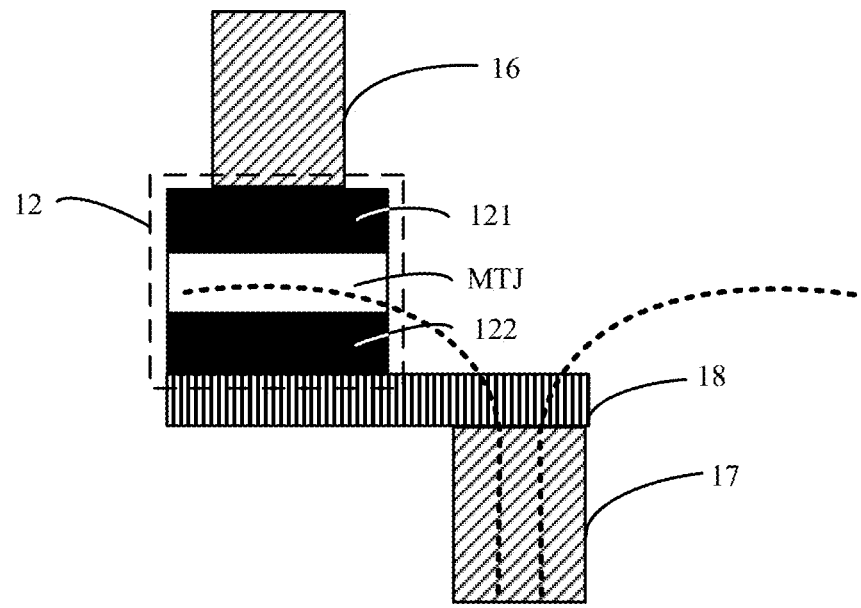
FIG. 11b is a schematic structural diagram of an MTJ element, a first magnetic structure, and a second magnetic structure according to an embodiment of this application.
Figure 12B:
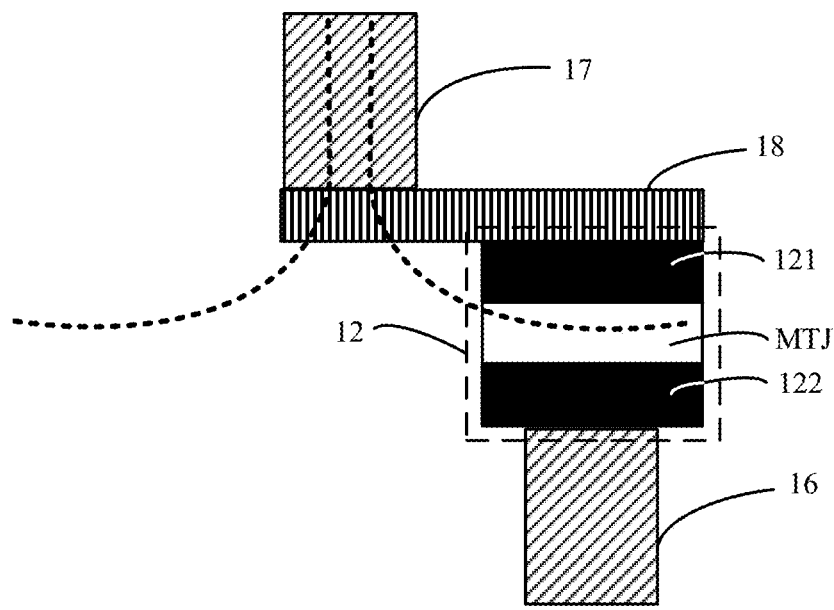
FIG. 12b is a schematic structural diagram of an MTJ element, a first magnetic structure, and a second magnetic structure according to another embodiment of this application.

As shown in FIG. 12*a* and FIG. 12*b*, the first magnetic structure 16 is connected between the MTJ element 12 and the source 141 or the drain 142 of the transistor T, and the second magnetic structure 17 is connected between the MTJ element 12 and the bit line BL. Alternatively, as shown in FIG. 11*a* and FIG. 11*b*, the first magnetic structure 16 is connected between the MTJ element 12 and the bit line BL, and the second magnetic structure 17 is connected between the MTJ element 12 and the source 141 or the drain 142 of the transistor T.

It should be noted that, dashed curves in FIG. 11*a*, FIG. 11*b*, FIG. 12*a*, and FIG. 12*b* represent magnetic lines of the second magnetic structure 17.

Herein, a process of forming the second magnetic structure 17 may be the same as the foregoing process of forming the first magnetic structure 16. Reference may be made to the foregoing descriptions, and details are not described herein again.

It should be understood that, because the second magnetic structure 17 is disposed on the current transmission path between the source 141 or the drain 142 of the transistor T and the bit line BL, the second magnetic structure 17 is conductive.

The following provides two implementations as examples, to enable the direction of the magnetic field generated by the second magnetic structure 17 at the free layer 1234 to be not parallel to the magnetization direction of the free layer 1234.

In a first implementation, as shown in FIG. 4*a*, FIG. 5*a*, and FIG. 6*a*, the memory further includes a connection layer 18 disposed between the second magnetic structure 17 and the MTJ element 12. The second magnetic structure 17 is electrically connected to the MTJ element 12 through the connection layer 18. A projection of the MTJ element 12 on the connection layer 18 does not overlap at least a part of areas of a projection of the second magnetic structure 17 on the connection layer 18.

In this implementation, in some embodiments, a magnetization direction of the second magnetic structure 17 is parallel to the stacking direction of the layers in the MTJ.

It should be noted that, to ensure that the magnetization direction of the second magnetic structure 17 can remain unchanged after an external magnetic field is removed, for example, the magnetization direction of the second magnetic structure 17 is parallel to the stacking direction of the layers in the MTJ, in other words, to enable the second magnetic structure 17 to have magnetic shape anisotropy, a length of the second magnetic structure 17 along a direction parallel to the stacking direction of the layers in the MTJ is greater than or equal to a length of the second magnetic structure 17 along a direction perpendicular to the stacking direction of the layers in the MTJ. When the second magnetic structure 17 is a cylinder, a height of the second magnetic structure 17 is greater than or equal to a diameter of the second magnetic structure 17.

On this basis, the direction of the magnetic field generated by the second magnetic structure 17 at the free layer 1234 may be adjusted by adjusting the magnetization direction of the second magnetic structure 17 and relative locations of the MTJ element 12 and the second magnetic structure 17 in the direction perpendicular to the stacking direction of the layers in the MTJ.

In addition, in some examples, the projection of the MTJ element 12 on the connection layer 18 overlaps a part of areas of the projection of the second magnetic structure 17 on the connection layer 18, and does not overlap a part of areas of the projection of the second magnetic structure 17 on the connection layer 18. In some other examples, the projection of the MTJ element 12 on the connection layer 18 does not overlap the projection of the second magnetic structure 17 on the connection layer 18, in other words, there is no overlapping area between the projection of the MTJ element 12 on the connection layer 18 and the projection of the second magnetic structure 17 on the connection layer 18. In the accompanying drawings of embodiments of this application, an example in which there is no overlapping area between the projection of the MTJ element 12 on the connection layer 18 and the projection of the second magnetic structure 17 on the connection layer 18 is used for illustration.

In a second implementation, the second magnetic structure 17 is in contact with the MTJ element 12, and a magnetization direction of the second magnetic structure 17 is perpendicular to the stacking direction of the layers in the MTJ.

Herein, that the stacking direction of the layers in the MTJ is a vertical direction is used as an example, and the magnetization direction of the second magnetic structure 17 may be a horizontal-left direction, or may be a horizontal-right direction.

It should be understood that, when the magnetization direction of the second magnetic structure 17 is perpendicular to the stacking direction of the layers in the MTJ, the direction of the magnetic field generated by the second magnetic structure 17 at the free layer 1234 is perpendicular to the stacking direction of the layers in the MTJ.

It should be noted that, to ensure that the magnetization direction of the second magnetic structure 17 can remain unchanged and can still be perpendicular to the stacking direction of the layers in the MTJ after an external magnetic field is removed, in other words, to enable the second magnetic structure 17 to have magnetic shape anisotropy, a length of the second magnetic structure 17 along a direction perpendicular to the stacking direction of the layers in the MTJ is greater than or equal to a length of the second magnetic structure 17 along a direction parallel to the stacking direction of the layers in the MTJ. When the second magnetic structure 17 is a cylinder, a diameter of the second magnetic structure 17 is greater than or equal to a height of the second magnetic structure 17.

It should be understood that, when the direction of the magnetic field generated by the second magnetic structure 17 at the free layer 1234 is perpendicular to the magnetization direction of the free layer 1234, and the free layer 1234 is flipped, the magnetic field generated by the second magnetic structure 17 at the free layer 1234 may apply magnetic field force to the free layer 1234, to facilitate flipping of the free layer 1234. When the direction of the magnetic field generated by the second magnetic structure 17 at the free layer 1234 is not parallel to and is not perpendicular to the magnetization direction of the free layer 1234, and the free layer 1234 is flipped, a magnetic field component (also referred to as an in-plane component) of the magnetic field generated by the second magnetic structure 17 at the free layer 1234 in the direction perpendicular to the stacking direction of the layers in the MTJ, namely, a net in-plane field generated by the second magnetic structure 17 at the free layer 1234, may apply magnetic field force to the free layer 1234, to facilitate flipping of the free layer 1234.

In this embodiment of this application, because the direction of the magnetic field generated by the second magnetic structure 17 at the free layer 1234 is not parallel to the magnetization direction of the free layer 1234, the magnetic field generated by the second magnetic structure 17 at the free layer 1234 may apply magnetic field force to the free layer 1234. This facilitates flipping of the free layer 1234. In this way, the current required for flipping the free layer 1234 is reduced, STT incubation time (incubation time) is reduced, and a flipping speed of the free layer 1234 is increased.

On this basis, in some examples, the direction of the magnetic field generated by the second magnetic structure 17 at the free layer 1234 is perpendicular to the magnetization direction of the free layer 1234.

It should be understood that, when the magnetization direction of the second magnetic structure 17 is parallel to the stacking direction of the layers in the MTJ, relative locations of the MTJ element 12 and the second magnetic structure 17 in the direction perpendicular to the stacking direction of the layers in the MTJ are adjusted, to enable the direction of the magnetic field generated by the second magnetic structure 17 at the free layer 1234 to be perpendicular to the magnetization direction of the free layer 1234. When the magnetization direction of the second magnetic structure 17 is parallel to the stacking direction of the layers in the MTJ, the magnetization direction of the second magnetic structure 17 may be the same as the magnetization direction of the pinning layer 1231, or may be opposite to the magnetization direction of the pinning layer 1231.

When the direction of the magnetic field generated by the second magnetic structure 17 at the free layer 1234 is perpendicular to the magnetization direction of the free layer 1234, the magnetic field generated by the second magnetic structure 17 at the free layer 1234 is more conducive to flipping of the free layer 1234. Therefore, the current required for flipping the free layer 1234 can be further reduced, the STT incubation time can be further reduced, and the flipping speed of the free layer 1234 can be more effectively improved.

Figure 13:
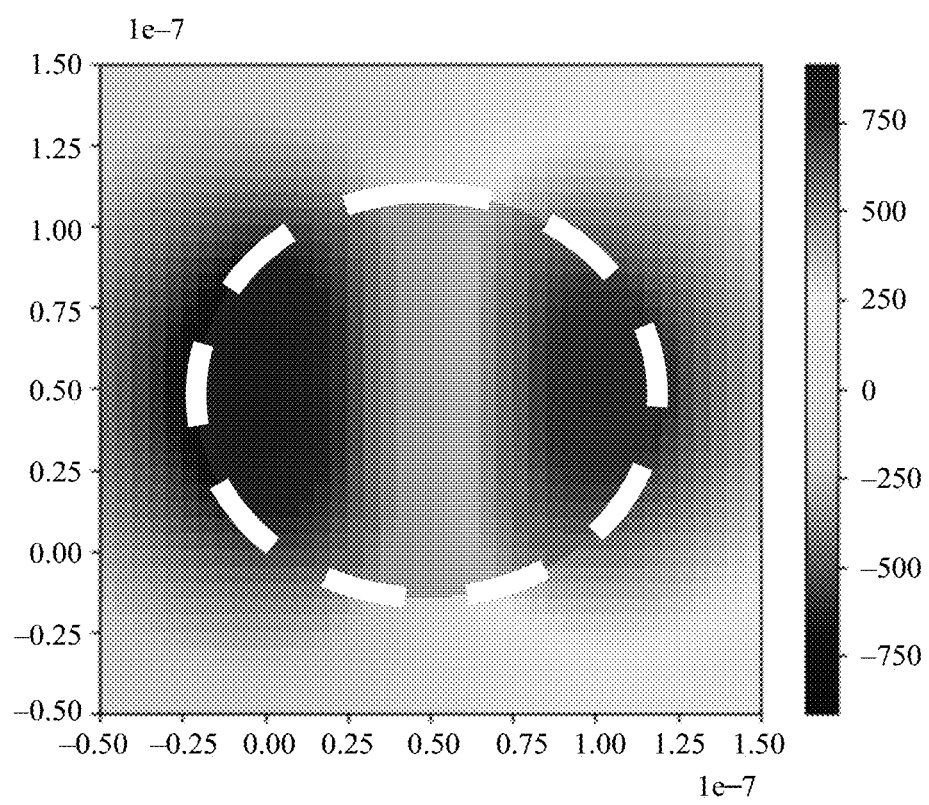

With reference to FIG. 8a, a block in FIG. 8a represents the second magnetic structure 17, and the magnetization direction of the second magnetic structure 17 is parallel to the stacking direction of the layers in the MTJ. It can be learned from a location shown by a black straight line B in FIG. 8a that, on a plane at the location shown by the black straight line B, an in-plane stray field (that is, a stray field whose magnetic field direction is perpendicular to the stacking direction of the layers in the MTJ) may be generated on two sides above the second magnetic structure 17. FIG. 13 is a simulation result diagram of the plane at the location shown by the black straight line B in FIG. 8a, and a dashed circle in FIG. 13 represents the MTJ. It can be learned from FIG. 13 that, on the plane at the location shown by the black straight line B in FIG. 8a, an in-plane stray field whose absolute value is about 300 Oe to 800 Oe is generated on two sides above the second magnetic structure 17, and the free layer 1234 may be flipped by using the stray field. In addition, a magnitude of the in-plane stray field, generated by the second magnetic structure 17, applied to the MTJ may be selected by moving the MTJ (the dashed circle in FIG. 13), in other words, the magnitude of the in-plane stray field, generated by the second magnetic structure 17, applied to the MTJ may be adjusted by adjusting relative locations of the MTJ and the second magnetic structure 17 in a horizontal direction.

The current $J_{th}$ required for flipping the free layer 1234 may be calculated according to the following formula:

$$J_{th} = \frac{2e\alpha M_S t_F \left( H_{K\!e\!f\!f} - 2\sqrt{H_X} \right)}{h\eta},$$

where $H_X$ is an in-plane field generated by the second magnetic structure 17 at the free layer 1234 (in other words, the direction of the magnetic field generated by the second magnetic structure 17 at the free layer 1234 is perpendicular to the stacking direction of the layers in the MTJ), $H_{K,e\!f\!f}$ is an effective anisotropy field, $M_S$ is saturated magnetization strength, $t_F$ is thickness of the free layer 1234, e is an electron constant, a is a magnetic damping (magnetic damping) factor, h is a Planck constant, and η is spin transfer efficiency.

It can be learned from the foregoing formula that, the in-plane field generated by the second magnetic structure 17 at the free layer 1234 can significantly reduce a magnitude of the current required for flipping the free layer 1234. In addition, when the in-plane field acts in the magnetization direction of the free layer 1234, a thermal disturbance effect is enhanced, the STT incubation time is reduced, flipping of the free layer 1234 is accelerated, writing duration of the MTJ is reduced, and dynamic writing power consumption of the MTJ is further reduced.

It should be noted that FIG. 4a, FIG. 4b, FIG. 5a, FIG. 5b, FIG. 6a, FIG. 6b, FIG. 7, FIG. 11a, FIG. 11b, FIG. 12a, and FIG. 12b in the specification of this application show only a connection relationship and a location relationship between the MTJ element 12 and the first magnetic structure 16 or the second magnetic structure 17, and do not limit a size relationship between the MTJ element 12 and the first magnetic structure 16 or the second magnetic structure 17. Along the direction perpendicular to the stacking direction of the layers in the MTJ, a size of the first magnetic structure 16 or the second magnetic structure 17 may be greater than, equal to, or less than a size of the MTJ element 12.

Based on this, an embodiment of this application further provides an electronic device. The electronic device includes a circuit board and a memory connected to the circuit board. The memory may be any memory provided above. The circuit board may be a printed circuit board (printed circuit board, PCB). Certainly, the circuit board may also be a flexible circuit board (flexible printed circuit board, FPC) or the like. The circuit board is not limited in this embodiment.

Optionally, the electronic device is different types of user equipment or terminal devices such as a computer, a mobile phone, a tablet computer, a wearable device, and a vehicle-mounted device. The electronic device may also be a network device such as a base station. Optionally, the electronic device further includes a package substrate, where the package substrate is fixed on the printed circuit board PCB by using a solder ball, and the memory is fixed on the package substrate by using a solder ball. It should be noted that, for details of related descriptions of the memory in the electronic device, refer to the descriptions of the memory in the foregoing embodiment. Details are not described in this embodiment of this application again.

On this basis, an embodiment of this application further provides a non-transitory computer-readable storage medium used together with a computer. The computer has software for creating an integrated circuit. The computer-readable storage medium stores one or more computer-readable data structures. The one or more computer-readable data structures have photomask data for manufacturing the memory provided in any figure provided above.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A memory, comprising a plurality of storage units and bit lines distributed in an array in a storage area of the memory, wherein:
    each of the plurality of storage units comprises a transistor and a magnetic tunnel junction (MTJ) element connected to the transistor;
    the MTJ element is disposed on a current transmission path between a source or a drain of the transistor and a bit line, the MTJ element comprises a pinning layer, a reference layer, a tunneling layer, and a free layer that are stacked in sequence, and a magnetization direction of the pinning layer is parallel to a stacking direction of layers in the MTJ;
    the memory further comprises a first magnetic structure disposed on the current transmission path and in direct contact with the MTJ element; and
    an included angle between a magnetization direction of the first magnetic structure and the magnetization direction of the pinning layer is (90°, 180°].

2. The memory according to claim 1, wherein the magnetization direction of the first magnetic structure is opposite to the magnetization direction of the pinning layer, and a magnitude of a magnetic field generated by the first magnetic structure at the free layer is the same as a magnitude of a magnetic field generated by the pinning layer at the free layer.

3. The memory according to claim 1, wherein the first magnetic structure is connected between the MTJ element and the source or the drain of the transistor.

4. The memory according to claim 1, wherein the first magnetic structure is connected between the MTJ element and the bit line.

5. The memory according to claim 1, wherein:
    the MTJ element further comprises a first electrode and a second electrode;
    the first electrode is located on a side that is of the free layer and that is away from the pinning layer, and the second electrode is located on a side that is of the pinning layer and that is away from the free layer; and
    the first electrode is electrically connected to the bit line, and the second electrode is electrically connected to the source or the drain of the transistor; or the first electrode is electrically connected to the source or the drain of the transistor, and the second electrode is electrically connected to the bit line.

6. The memory according to claim 1, wherein a material of the first magnetic structure comprises one or more of monatomic cobalt, monatomic iron, monatomic nickel, and an alloy comprising at least one of cobalt, iron, or nickel.

7. The memory according to claim 1, wherein the pinning layer comprises a ferromagnetic layer and a heavy metal layer that are alternately stacked along the stacking direction of the layers in the MTJ.

8. The memory according to claim 7, wherein:
    a material of the ferromagnetic layer comprises one or more of monatomic cobalt, monatomic iron, monatomic nickel, and an alloy comprising at least one of cobalt, iron, or nickel; and
    a material of the heavy metal layer comprises one or more of monatomic platinum, monatomic tantalum, monatomic copper, monatomic iridium, monatomic ruthenium, monatomic tungsten, and an alloy comprising at least one of platinum, tantalum, copper, iridium, ruthenium, or tungsten.

9. The memory according to claim 1, wherein a material of the pinning layer is a perpendicular magnetic anisotropy material.

10. The memory according to claim 9, wherein the material of the pinning layer comprises one or more of an iron-platinum alloy and a cobalt-platinum alloy.

11. The memory according to claim 1, wherein:
    materials of the reference layer and the free layer comprise a cobalt-ferroboron (CoFeB) alloy; and
    a material of the tunneling layer comprises magnesium oxide (MgO).

12. The memory according to claim 1, wherein a gate of the transistor is connected to a word line control circuit through a word line, the source or the drain of the transistor is connected to a data line, and the bit line is connected to a bit line control circuit.

13. The memory according to claim 1, wherein:
    the memory further comprises a second magnetic structure disposed on the current transmission path;
    a direction of a magnetic field generated by the second magnetic structure at the free layer is not parallel to a magnetization direction of the free layer; and
    the first magnetic structure is connected between the MTJ element and the source or the drain of the transistor, and the second magnetic structure is connected between the MTJ element and the bit line; or
    the first magnetic structure is connected between the MTJ element and the bit line, and the second magnetic structure is connected between the MTJ element and the source or the drain of the transistor.

14. The memory according to claim 13, wherein the direction of the magnetic field generated by the second magnetic structure at the free layer is perpendicular to the magnetization direction of the free layer.

15. The memory according to claim 13, wherein the memory further comprises a connection layer disposed between the second magnetic structure and the MTJ element, and the second magnetic structure is electrically connected to the MTJ element through the connection layer; and a projection of the MTJ element on the connection layer does not overlap at least a part of areas of a projection of the second magnetic structure on the connection layer.

16. An electronic device, comprising a circuit board and a memory electrically connected to the circuit board, wherein the memory comprises a plurality of storage units and bit lines distributed in an array in a storage area of the memory, and wherein:

each of the plurality of storage units comprises a transistor and a magnetic tunnel junction (MTJ) element connected to the transistor;

the MTJ element is disposed on a current transmission path between a source or a drain of the transistor and a bit line, the MTJ element comprises a pinning layer, a reference layer, a tunneling layer, and a free layer that are stacked in sequence, and a magnetization direction of the pinning layer is parallel to a stacking direction of layers in the MTJ;

the memory further comprises a first magnetic structure disposed on the current transmission path and in direct contact with the MTJ element; and an included angle between a magnetization direction of the first magnetic structure and the magnetization direction of the pinning layer is (90°, 180°].

17. The electronic device according to claim 16, wherein the magnetization direction of the first magnetic structure is opposite to the magnetization direction of the pinning layer, and a magnitude of a magnetic field generated by the first magnetic structure at the free layer is the same as a magnitude of a magnetic field generated by the pinning layer at the free layer.

18. The electronic device according to claim 16, wherein the first magnetic structure is connected between the MTJ element and the source or the drain of the transistor.

19. The electronic device according to claim 16, wherein the first magnetic structure is connected between the MTJ element and the bit line.

20. The electronic device according to claim 16, wherein:

the MTJ element further comprises a first electrode and a second electrode;

the first electrode is located on a side that is of the free layer and that is away from the pinning layer, and the second electrode is located on a side that is of the pinning layer and that is away from the free layer; and the first electrode is electrically connected to the bit line, and the second electrode is electrically connected to the source or the drain of the transistor; or the first electrode is electrically connected to the source or the drain of the transistor, and the second electrode is electrically connected to the bit line.

* * * * *